US012806617B2

(12) United States Patent
Rebolledo Uscanga et al.

(10) Patent No.: US 12,806,617 B2
(45) Date of Patent: Nov. 24, 2026

(54) MICROMACHINED ELECTROACTIVE MEMBRANES WITH EMBEDDED MICROFLUIDIC CHANNELS AND METHODS OF MAKING AND USING THE SAME

(71) Applicant: RUTGERS, THE STATE UNIVERSITY OF NEW JERSEY, New Brunswick, NJ (US)

(72) Inventors: Fernando Antonio Rebolledo Uscanga, Highland Park, NJ (US); Jeffrey Zahn, Princeton, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 1007 days.

(21) Appl. No.: 18/145,684

(22) Filed: Dec. 22, 2022

(65) Prior Publication Data

US 2023/0201823 A1 Jun. 29, 2023

Related U.S. Application Data

(60) Provisional application No. 63/293,446, filed on Dec. 23, 2021.

(51) Int. Cl.
*B01L 3/00* (2006.01)

(52) U.S. Cl.
CPC ... *B01L 3/502707* (2013.01); *B01L 3/502715* (2013.01); *B01L 3/50273* (2013.01); *B01L 2300/0645* (2013.01); *B01L 2300/0816* (2013.01); *B01L 2300/0861* (2013.01); *B01L 2400/0415* (2013.01); *B01L 2400/0475* (2013.01); *B01L 2400/0638* (2013.01)

(58) Field of Classification Search
CPC ......... B01L 3/502707; B01L 3/502715; B01L 3/50273; B01L 2300/0645; B01L 2300/0816; B01L 2300/0861; B01L 2400/0415; B01L 2400/0475; B01L 2400/0638
See application file for complete search history.

(56) References Cited

U.S. PATENT DOCUMENTS

| | | | |
|---|---|---|---|
| 9,288,915 | B2 | 3/2016 | Tai et al. |
| 2004/0007063 | A1 | 1/2004 | Tai et al. |
| 2004/0188648 | A1 | 9/2004 | Xie et al. |
| 2007/0085038 | A1 | 4/2007 | Tai et al. |

OTHER PUBLICATIONS

Chen et al., Surface-Micromachined Parylene Dual Valves for On-Chip Unpowered Microflow Regulation, JMEMS, 16(2): 223-231 (Apr. 2007).
Cho et al., Human mammalian cell sorting using a highly integrated micro-fabricated fluorescence-activated cell sorter (uFACS), Lab Chip, 10(12): 1567-1573 (2010).
Kidchob, Analytical and Numerical Modeling of Electrostatically Driven Micromembranes, Master's thesis, published in Jan. 2021.
(Continued)

*Primary Examiner* — Brian J. Sines
(74) *Attorney, Agent, or Firm* — MARSHALL, GERSTEIN & BORUN LLP

(57) ABSTRACT

Devices we freely supported electroactive membranes and embedded microfluidic channels are disclosed herein. Methods of fabricating such devices utilize multilayer polymer micromachining to form integrated membrane and microfluidic structures.

20 Claims, 40 Drawing Sheets

(56) References Cited

OTHER PUBLICATIONS

Kim et al., Fiber-Optic Laser Doppler Vibrometer to Dynamically Measure MEMS Actuator With In-Plane Motion, JMEMS, 18(6): 1365-1370 (2009).

Ma et al., Low-Actuation Voltage MEMS Digital-to-Analog Converter with Parylene Spring Structures, Sensors (Switzerland), 15(9): 21567-21580 (2015).

Patrascu et. al., Flexible, Electrostatic Microfluidic Actuators Based on Thin Film Fabrication, Sensors and Actuators A: Physical. 186:249-256 (2012).

Xie et al., Surface micromachined electrostatically actuated micro peristaltic pump, Lab Chip, 4: 495-501 (2004).

Yao et al., Dielectric Charging Effects on Parylene Electrostatic Actuators, Proceedings of the IEEE International Conference on Micro Electro Mechanical Systems (MEMS), 614-617 (2002).

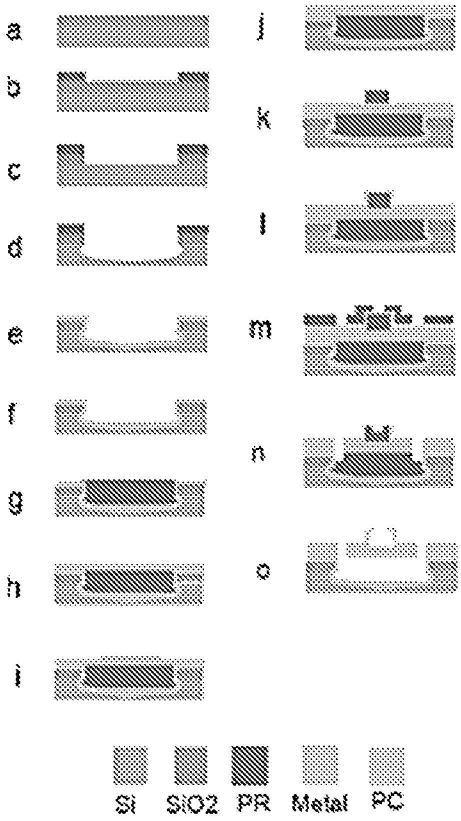

a) SiO2 coated wafer
b) PR mask for HF etching of the SiO2
c) Opened window of the Si layer
d) XeF2 etching or KOH etching of Si cavity (gap)
e) 1st thin film deposition of Parylene C
f) Patterning of the bottom electrode
g) Cavity filling with PR
h) 2nd thin film deposition of Parylene C for the formation of the membrane composite
i) Patterning of the top electrode
j) 3rd thin film deposition of Parylene C to finalize the formation of the membrane composite
k) Patterning of the microfluidic channels networks on top of the membrane composite
l) 4th thin film deposition of thick Paryelene C layer to enclose the microfluidic channels
m) Patterning of PR etching mask (Vent holes and microchannels reservoirs)
n) RIE etching of the openings in the Parylene C membrane
o) PR stripping and releasing of the Parylene-based membrane with embedded microfluidic channels

Figure 1

Top view of μPEMs
(Cantilever)

Top view of μPEMs
(Microbridge)

Top view of μPEMs
(Microbridge)

Top view of μPEMs
(Microbridge)

Top view of μPEMs
(4 individual electrodes)

Top view of μPEMs
(4 individual electrodes)

Top view of μPEMs
(4 individual electrodes)

Top view of μPEMs
(4 individual electrodes)

| µPEMs with embedded microfluidic channels | Theoretical Pull-in Voltage | Experimental Pull- in Voltage (µ ± σ) |
|---|---|---|
| 14 µm | 100 V | 101.08 ± 3.91 V |
| 15 µm | 110 V | 111.16 ± 2.41 V |
| 16 µm | 120 V | 124.54 ± 2.56 V |

Example of Microsystem with
15 µm thickness

MICROMACHINED ELECTROACTIVE MEMBRANES WITH EMBEDDED MICROFLUIDIC CHANNELS AND METHODS OF MAKING AND USING THE SAME

CROSS-REFERENCE TO RELATED APPLICATION

The benefit of priority to U.S. Patent Provisional Application No. 63/293,446 filed Dec. 23, 2021 is hereby claimed and the disclosure is incorporated herein by reference in its entirety.

FIELD

The disclosure relates to polymer-based electroactive membranes with embedded microfluidic channels, systems containing the same, and methods of making and using the same.

BACKGROUND

Lab-on-Chip and System-on-Chip type devices can include micromachined microsystems with several compartments and modules integrated within each other including microfluidic channel structures within the system. Conventionally, the devices are fabricated using soft lithography techniques with silicone molding on SU-8 relief structures and manual integration of compartments, using bonding techniques and off-chip components. In some instances, devices have been fabricated using a single fabrication process, avoiding manual integration, for example, taking advantage of MEMS fabrication technologies, and using micromachinable polymers.

Pneumatic actuation is commonly used due to the ease of fabrication with soft-lithography techniques, developing SU-8 microstructures and patterns for further replica molding using Polydimethylsiloxane (PDMS) as the structural material to fabricate and prototype microfluidic chips. However, pneumatic actuation does not provide complete control for precise reproducibility and requires off-chip pneumatic connections, resulting in loss of integration capabilities.

Electrostatic actuation methods can eliminate the need for complicated interconnects, while providing greater control and compact integration. Electrostatic actuation dates back to the earliest MEMs devices especially in surface micromachined polysilicon devices such as micromotors and lateral comb drives.

SUMMARY

Devices in accordance with the disclosure provide μPEMs using Parylene-based micromachining approaches. While similar approaches have been used to create microactuators for peristaltic pumping, microvalves, and spring-like structures for digital-to-analog converter MEMs devices. Prior approaches have not provided for integration of microfluidic channels with electrostatic actuators. Devices of the disclosure can beneficially provide a microsystem platform for applications requiring precise biological manipulations.

A device in accordance with the disclosure can include a substrate having a cavity defined therein; one or more bottom electrodes disposed within the cavity; an electroactive membrane having one or more portions fixed to the substrate and a portion extending over the cavity, the electroactive membrane being formed from a polymer-metal composite, the composite comprising a polymeric membrane material having one or more top electrodes disposed within the polymeric membrane material; and a microfluidic structure arranged on top of the membrane, the microfluidic structure comprising one or more microfluidic channels and/or one or more microfluidic chambers. The one or more top electrodes and the bottom electrodes are separated by a gap having a first gap distance defined by a depth of the cavity when there is no applied voltage, and the portion of the electroactive membrane extending over the cavity is adapted to actuate into the cavity upon application of a voltage between the one or more top and bottom electrodes such that at least a portion of the gap is reduced to a second gap distance smaller than the first gap distance.

The polymer membrane material can be selected to be a micromachinable, biocompatible, transparent, and structurally flexible polymer. One such polymer is Parylene C. It has been found that the use of such polymers can allow for whole microsystem/MEMS to be capable of increasing compartmentalized fabrication, monolithic integration, and further application capabilities.

A system in accordance with the disclosure can include a substrate having two or more cavities defined therein; one or more bottom electrodes disposed within each of the two or more cavities; two or more electroactive membranes each having one or more portions fixed to the substrate and a portion extending over a respective one of the two or more cavities, the two or more electroactive membranes each being formed from a polymer-metal composite, the composite comprising a polymeric membrane material having one or more top electrodes disposed within the polymeric membrane material; and a microfluidic structure arranged on top of the two or more membranes, the microfluidic structure comprising one or more microfluidic channels and/or one or more microfluidic chambers. The one or more top electrodes and the one or more bottom electrode of each membrane and respective cavity over which the membrane extends are separated by a gap having a first gap distance defined by a depth of the cavity when there is no applied voltage. The portion of each electroactive membrane extending over the respective cavity is adapted to actuate into the cavity upon application of a voltage by the one or more top electrodes and the one or more bottom electrodes such that at least a portion of the gap is reduced to a second gap distance smaller than the first gap distance.

A method of making the device or system of the disclosure can include defining the cavity or two or more cavities in the substrate; depositing a first thin film of polymeric membrane material on at least a bottom surface of the cavity or in each cavity. depositing a metal layer on the first thin film of polymeric membrane material to form the one or more bottom electrodes within the cavity or two or more cavities; filling the cavity or two or more cavities with a photoresist; depositing a second thin film of polymeric membrane material on the photoresist filled within the cavity or two or more cavities; patterning a metal layer on the second thin film of polymeric membrane material to form the one or more top electrodes; depositing a third thin film of polymeric membrane material on the one or more top electrodes; depositing and patterning a photoresist on the third thin film to define the microfluidic structure; depositing a fourth thin film of polymeric material on the photoresist patterned to define the microfluidic structure; removing the photoresist patterned to define the microfluidic structure and the photoresist filled within the cavity or two or more cavities to thereby form the device.

A method of using the device of the disclosure can include introducing a fluid sample into the microfluidic structure; and applying a voltage to the membrane using the one or more top electrodes and the bottom electrodes to actuate the membrane, thereby introducing a force into the fluid sample thereby promoting circulation of the flow of the sample and/or introduce a stress and/or strain into the sample.

BRIEF DESCRIPTION OF THE DRAWINGS

FIG. 1 is a schematic illustration of a process of making a device in accordance with the disclosure;

DETAILED DESCRIPTION

Figure 2A:
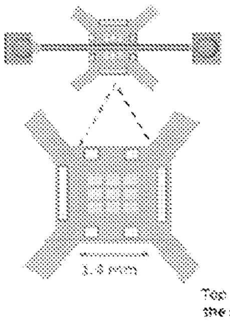
FIG. 2A is a top view of a device in accordance with the disclosure.

Devices in accordance with the disclosure include a substrate having a cavity defined therein with one or more bottom electrodes disposed within the cavity. An electroactive membrane is fixed to the substrate at one or more regions or portions. The electroactive membrane has a portion that extends over the cavity. A microfluidic structure is arranged on top of the membrane and includes one or more microfluidic channels and/or one or more microfluidic chambers. The electroactive membrane is formed from a polymer-metal composite that comprises a polymeric membrane material having one or more top electrodes disposed within the polymeric membrane material. The one or more top electrodes and bottom electrodes are separated by a gap having a first gap distance defined by a depth of the cavity when there is no applied voltage. The portion of the electroactive membrane extending over the cavity is adapted to actuate into the cavity upon application of a voltage between the one or more top and bottom electrodes such that at least a portion of the gap is reduced to a second gap distance that is smaller than the first gap distance.

The device of the disclosure can advantageously provide for a tunable and controlled actuation of the electroactive membrane through control over the arrangement of the top and bottom electrodes along with control over the applied voltage and type of voltage. For example, the electrodes can be arranged such that defined regions of the portion of the electroactive membrane extending over the cavity can be individually actuated. This can allow for various types of actuation patterns to be achieved with the device of the disclosure. Patterns of actuation can also be achieved by controlling the type of voltage applied. For example, DC voltage can be applied for static deflection. A square wave voltage can be applied for periodic deflections. Sinusoidal (AC) voltage could also be used to achieve periodic deflections. Sinusoidal voltage at the membrane mechanical resonance frequency can be used to amplify the deflection amplitude. Other waveforms, including but not limited to, saw wave can also be used.

Devices of the disclosure can advantageously be fabricated as a single component, with the microfluidic structure integrally formed with the membrane. This can avoid manual integration and allow for increased structural flexibility, increased compartmentalization, and monolithic integration.

Any suitable substrate material can be used for the substrate. For example, the substrate can be a silicon wafer, quartz wafer, or amorphous glass wafer. A suitable substrate can be selected for a given fabrication methods as further detailed herein. The substrate can include an oxide layer, such as silicon dioxide formed thereon. For example, the oxide layer can have a thickness of 5000 Å. The oxide layer can be deposited, for example, in an oxidation furnace. The substrate may or may not include high conductivity properties The cavity can be micromachined into the cavity for example, by dry or wet etching processes. The depth of the cavity defines the gap between the top and bottom electrode(s) when no voltage is applied between the electrodes. This forms an air gap between the electrodes. The first gap distance can be about 5 μm to about 20 μm, about 7 μm to about 10 μm, about 8 μm to about 15, or about 10 μm to about 20 μm. Other suitable first gap distances include, for example, about 5, 6, 7, 8, 9, 10, 11, 12, 13, 14, 15, 16, 17, 18, 19, or 20 μm and any numerical ranges defined between such values.

The gap can have a width of about 100 μm to about 1500 μm, about 200 μm to about 800 μm, and about 900 μm to about 1500 μm. Others widths include, for example, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, and 1500 μm and any numerical ranges defined between such values.

The bottom of the cavity can be coated with a polymeric layer, such as the same material as the polymeric membrane material. One or more bottom electrodes can be deposited on the bottom of the cavity using any suitable metal for forming an electrode.

The membrane can be formed of any suitable polymeric material. Any polymeric material capable of being coated on a substrate by vapor phase deposition or spin coating as a liquid solution could be used. For example, suitable polymers can include those which can be conformally deposited by chemical vapor deposition (CVD) or plasma enhanced chemical vapor deposition techniques. Such materials include, but are not limited, Parylene C, Parylene F, Polyamide (Nylon), Teflon fluoropolymerthin, polydimethylsiloxane (PDMS), Polyimide (Kapton), or SU-8.

The membrane includes one or more top electrodes embedded within the polymeric membrane material. This can be accomplished through layer-by-layer deposition of the polymeric membrane material with patterning of a suitable metal for the electrodes on a layer before subsequent layer formation.

The membrane can have a thickness of about 5 μm to about 25 μm, about 10 μm to about 20 μm, or about 7 μm to about 16 μm. Other suitable thicknesses can include, for example, about 5, 6, 7, 8, 9, 10, 11, 12, 13, 14, 15, 16, 17, 18, 19, 20, 21, 22, 23, 24, or 25 μm and any range defined between such values.

The membrane can have a surface area of about 300 $\mu m^2$ to about 2,250,000 $\mu m^2$, about 500 $\mu m^2$ to about 1000 $\mu m^2$, about 1500 $\mu m^2$ to about 35,000 $\mu m^2$, about 10,000 $\mu m^2$ to about 500,000 $\mu m^2$, or about 1,000,000 $\mu m^2$ to about 2,000,000 $\mu m^2$. Other suitable values can include, for example, about 300, 400, 500, 600, 700, 800, 900, 1000, 2000, 3000, 4000, 5000, 6000, 7000, 8000, 9000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, 1,250,000, 1,500,000, 1,750,000, 2,000,000, or 2,250,000 $\mu m^2$ and any ranges defined between such values.

The microfluidic structure is formed on top of the membrane. As used herein the term "microfluidic structure" generally refers to a structure having channels and/or chambers that geometrically constrains fluids contained and/or flowing there-through on a small scale on the order of micrometers to 100s of micrometers. Advantageously in some embodiments the microfluidic structure can be integrally formed on top of the membrane using the polymeric membrane material. Any suitable microfluidic structure can be used, which can include any arrangement of one or more microchannels and/or microchambers with converging or diverging branches. Inlets and outlets can also be defined within the microfluidic structure.

Figure 2B:
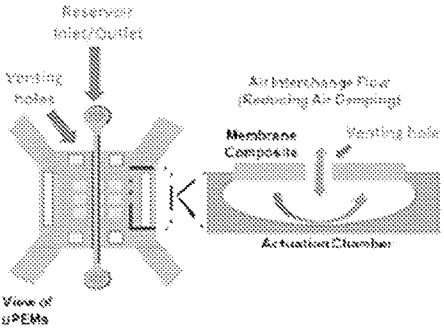
FIG. 2B is a side view of a device in accordance with the disclosure.
Figure 2C:
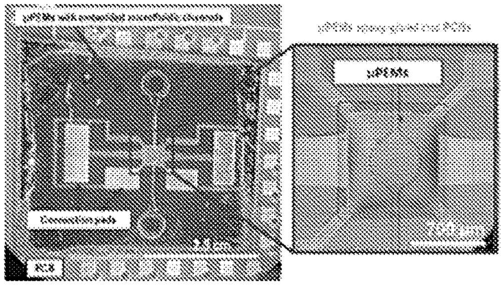
FIG. 2C is an image of device in accordance with the disclosure assembled onto a PCB chip.
Figure 2D:
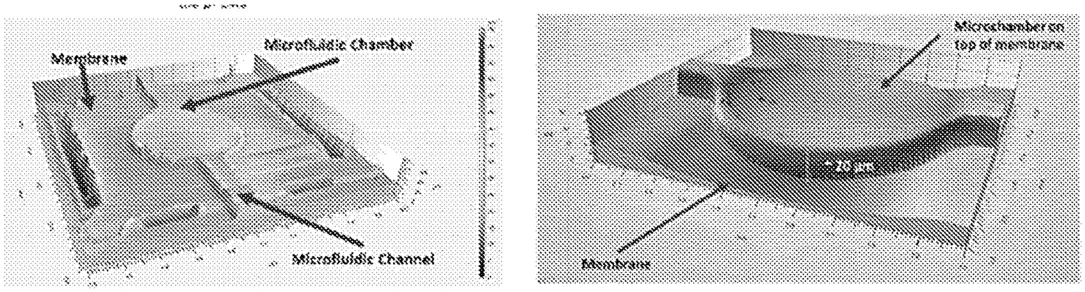
FIG. 2D show surface profilometry three-dimensional mapping of a device in accordance with the disclosure.

FIG. 2 illustrates a device in accordance with the disclosure, showing the cavity in a cross-sectional view of FIG. 2B. Incorporation of the device onto a PCB chip is shown in FIG. 2B. FIG. 2C shows a surface profilometry three-dimensional mapping of a device.

Figure 3A:
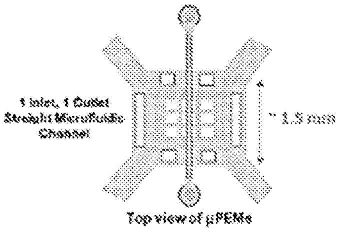
FIGS. 3A-3P are top views of various device configurations in accordance with the disclosure.
Figure 3B:
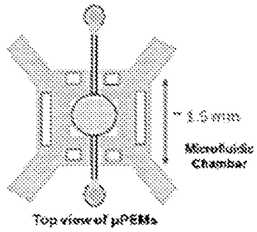
Figure 3C:
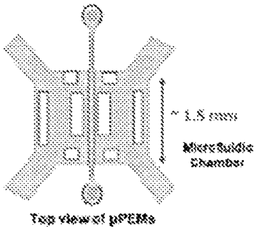
Figure 3D:
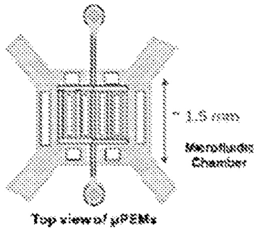
Figure 3E:
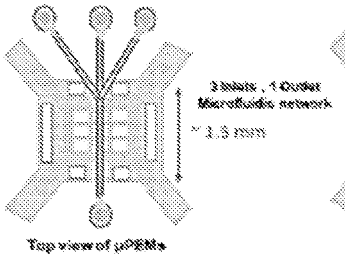
Figure 3F:
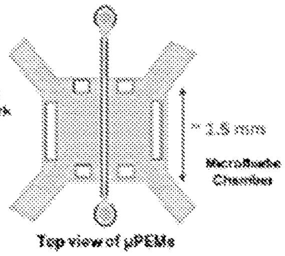
Figure 3G:
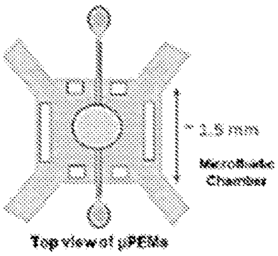
Figure 3H:
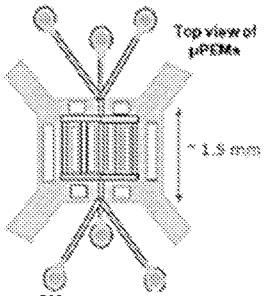
Figure 3I:
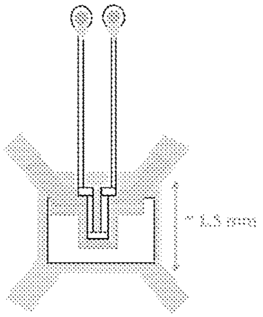
Figure 3J:
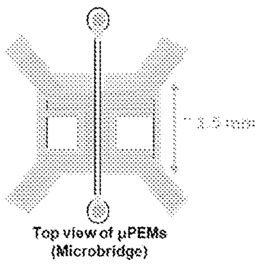
Figure 3K:
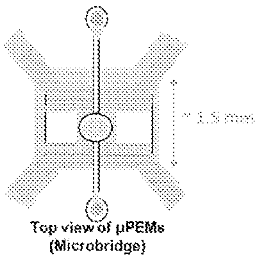
Figure 3L:
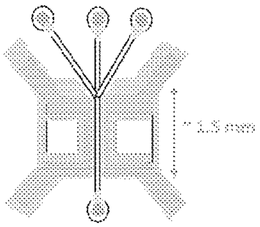
Figure 3M:
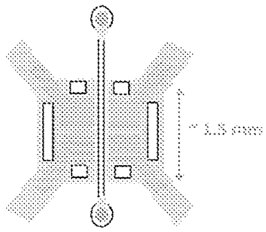
Figure 3N:
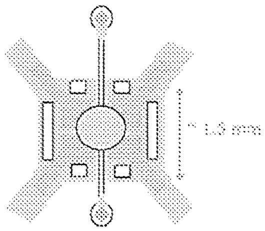
Figure 3O:
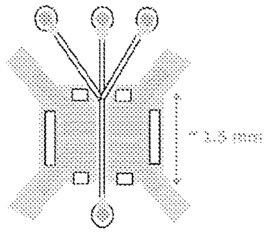
Figure 3P:
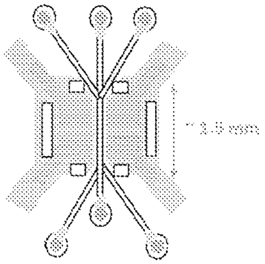

Referring to FIG. 3A-3P, the device can have various arrangements including membrane shape, numbers of electrodes, and microfluidic structures. The membrane can be formed to various configurations, including being rectangular, circular, elliptical, polygon-shape, and the like. The membrane can also be arranged such that it is formed as a plate supported on all sides, a suspended bridge, and a cantilever bridge.

Other arrangements can include, for example, a membrane composite with a square or circular shape top electrode design, microfluidic structures with one or more microfluidic channel structures and architectures embedded on top of the membrane composite, a membrane design with a beam-shape, fixed beam to beam or serpentine-mesh like structures, bridge or cantilever shape-like microstructures with embedded microfluidic channels on top of the structures.

Referring to FIGS. 2 and 10, for example, the device can include a square shaped membrane composition having an actuation electrode sandwiched between Parylene C layers. The membrane can be suspended on top of a micromachined pit or cavity that will function as an actuation chamber, creating a gap between the movable electrode and the ground electrode at the bottom of the cavity.

In arrangements in which the membrane is in the form of a suspended bridge, higher deflection can be achieved, which can have the potential to have a pronounced mechanical resonance frequency.

In arrangements in which the membrane is in the form of a suspended cantilever bridge, higher mechanical resonance behavior can be achieved. Additionally, there can be less squeeze dampening under the structure due to the structural opening within the device for such arrangement.

The membrane can include one more venting holes, which can facilitate with releasing the membrane from a photoresist structure during fabrication.

Devices of the disclosure can have any suitable number of top and bottom electrodes. For example, the device can have from 1 to 8 top electrodes. For example, the device can have from 1 to 8 bottom electrodes. The electrodes can be arranged to define distinct regions of the membrane capable of being individually actuated through application of voltage between particular electrode pairs.

In some arrangements, the device can have four individual top electrodes or electrode pairs (top and bottom electrodes). This can allow for actuation of defined regions of the membrane individually through individual addressability of the electrodes. Such an electrode configuration and actuation of one of the electrodes at different times from the others can result in side deflection of the whole membrane. Actuation of two electrodes or permutation of electrode pair actuation can allow for different deflection patterns to be achieved, which can allow for different solid-fluid circulation behavior within the microfluidic structure. A time control circuit or other control unit can be incorporated in to the device or system incorporating the device to control actuation patterns.

One or more devices of the disclosure can be incorporated into a system. The system can include separate but interconnected devices assembled on a chip. Alternatively, an integrated system can be formed having two more cavities defined in a substrate, one or more bottom electrodes in each cavity, and an electroactive membrane formed over each cavity. A single integrated microfluidic structure can be formed in such embodiments over the electroactive membranes of the system.

The devices and systems of the disclosure can have any additional components for a given application such as additional electrical connections, control systems, fluid pumps, reservoirs, and/or fluidic connections to external devices, reservoirs, chambers, systems or devices, include for liquids and gasses.

Figure 4:
FIG. 4 is a process flow chart for fabrication of a device in accordance with the disclosure.

Devices and systems of the disclosure can be made by a microfabrication process such as outlined in FIGS. 1 and 4. The process can include defining a cavity in the substrate and depositing a first thin film depositing a first thin film of polymeric membrane material on at least a bottom surface of the cavity and depositing and patterning a metal layer on the first thin film of polymeric membrane material to form the one or more bottom electrode.

The cavity can be defined through micromachining, for example, by wet or dry etching. For example, KOH etching (wet etching) or $XeF_2$ etching (isotropic dry etching) could be used.

The one or more bottom electrodes can be formed using photolithography followed by a lift-off approach after physical vapor deposition of metal films. In addition to the bottom electrode(s), this process set can further include forming traces and connection pads for the electrode(s).

The cavity can then be filled with a photoresist material. Any suitable photoresists as are known in the art can be used in the patterning described herein.

A second thin film of polymeric membrane material can then be deposited on the photoresist. A metal layer can be deposited on the second thin film and patterned to form the one or more top electrodes. A third thin film of polymeric membrane material is then deposited over the one or more top electrodes and then patterned to define the membrane.

Any suitable masking and etching and/or micromachining techniques can be used in the patterned steps described herein. For example, a photoresist can be patterned on the third thin film and the third thin film can be etched to define the membrane shape. A fourth thin film is deposited and patterned to define the microfluidic structure. The fourth thin film can be deposited for example on top of the photoresist patterned on the third thin film. A further photoresist can then be patterned on the fourth thin film and then etching can be done to thereby form the membrane shape and microfluidic structure in the third and fourth thin films. The fourth thin film can be additionally patterned to form vent holes in the membrane as well as the microfluidic structure. Once the membrane and microfluidic structure has been defined, the photoresist can be stripped thereby releasing the membrane and embedded microfluidic structure and forming the device.

Patterning in the process described herein can be accomplished through surface micromachining and/or etching using sacrificial layers of photoresist to define desired patterns. For example, $O_2$ plasma etching can be used.

In one example method of making a device, the following steps can be performed:

Provide a supporting substrate such as a silicon wafer or silicon dioxide coated wafer with one or both sides polished, or any other supporting substrate;

Photolithographic pattern one or more window-shaped opening/designs within the silicon or silicon dioxide coated wafer or any other supporting substrate;

Perform etching in the opening or window-shaped designs within the silicon or silicon dioxide coated wafer or any other supporting substrate, silicon etching or any other material from the supporting substrate will be pursued via dry silicon etching approach using a XeF2 etching system or via wet silicon etching approach using KOH etching or any other etching approach for the respective supporting substrate material. Recess or cavity can be of various depths, from nanometers to hundreds of micrometers;

Deposit a layer of Parylene C as an insulation layer on both sides of the silicon or silicon dioxide coated wafer or any other supporting substrate, as a protective and insulation layer between the future processing and the silicon substrate or any other supporting substrate;

Deposit and pattern a first conducting layer via lift off approach to form a first set of one or more electrodes as the ground or negative electrode(s) of the whole microsystem and PEMs devices;

Deposit a layer of Parylene C as an insulation layer on both sides of the silicon or silicon dioxide coated wafer, or any other supporting substrate, as a protective and insulation layer;

Form a filling and sacrificial layer within the cavity/recess on the silicon or silicon dioxide coated wafer or any other supporting substrate, this filling photoresist or any other material will remain only in one or more cavity/recesses within the silicon substrate or any other supporting substrate, in order to create the air gap between the working electrodes;

Deposit a layer of Parylene C to enclose the air gap created for the working electrodes and membrane composite formation;

Deposit and pattern a second conducting layer via lift off approach to form a second set of one or more electrodes as the actuation or positive electrode(s) of the whole microsystem and devices on top of the membrane composite, which in fact is the structure that will deflect downwards/upwards after applying a voltage differential using AC/DC input(s) between working electrodes. Deflection can be measured by surface profilometry or optical measurements via OCT approaches;

Deposit a layer of Parylene C to insulate the second set of one or more electrodes on top of the membrane composite, in addition to insulate the electrode(s) from the microfluidic channel structures coming up in the next step of the microfabrication;

Pattern microfluidic channel structures and networks on top of the membrane composite(s) with one or more sacrificial layers, commonly using photoresist as the sacrificial layer. Microfluidic channel structures could range in height from nanometers to hundreds of micrometers;

Deposit a layer of Parylene C to enclose the microfluidic channel structures formed by the sacrificial layer of photoresist or any other material, forming a microshell structure for the microfluidic channel and network(s);

Open regions such as microfluidic reservoirs, inlets, outlets, and venting holes to get access to the sacrificial layers of photoresist or any other materials used as sacrificial layers;

Dice silicon or silicon dioxide coated wafers or any other supporting substrate, to separate in individual dies each of the devices for further microfabrication steps;

Soak individual dies in Acetone and/or IPA, or any other solution and machine such as a critical point dryer to release sacrificial layers to free-support the individual devices with subsequent drying to avoid surface tension collapse of structures;

Perform other steps, as desired such as packaging, bonding into PCBs, electrical connections within the dies and PCBs for ease of handling, testing and characterization within characterization apparatus and systems, within others.

Systems in accordance with the disclosure can be formed by the same process in an integral manner by forming two or more cavities in the substrate and defining two or more membranes.

The devices of the disclosure follow similar actuation and physical principles to electrostatically driven MEMS actuators, they are formed by two electrodes, one fixed (commonly the ground) and the other one is free and moveable (usually the positive or drive), just like parallel plates and capacitive microbridges, they have a gap or space between the electrodes, that will decrease as there is an applied voltage between them. There are two forces occurring between the microsystem while under actuation, one called electrostatic force, which is the force generated as a voltage differential is applied between the electrodes, and mechanical force, which is the restoring force from the structure that will oppose the movable plate deflection due to Hooke's law. This behavior is described in Equation 1:

$$\sum F = -Fe + Fm = 0 = -\frac{\varepsilon A V^2}{2(d-x)^2} + kx(1) \qquad \text{(eq 1)}$$

Where the electrostatic force is dependent on the surface area (A) of the electrodes, the voltage applied (V), the initial gap distance (d), the displacement of the plates (x), the permittivity of the space (ε), and the stiffness coefficient (k) of the plate. There is a certain point where equilibrium is no longer sustainable in the system, and the electrostatic force overwhelms the restoring spring force, resulting in the movement of the top electrode towards the ground electrode. The voltage where the electrostatic force is greater than the restoring force is known as the pull=in voltage or VPi. The pull-in voltage can allow for determination of a range of operation voltages from the actuators.

Kirchhoff-Love plate theory, assuming the maximum deflection of the plate occurs at the geometric center of the μPEMs was used to better understand real plate deflection. Two potential membrane electrode shape-forms were considered, square and circular.

To calculate the stiffness of the μPEMs, the maximum deflection of the plate happening at the center of the structure was calculated. Taking into consideration a uniform load per area, the maximum deflection for square and circulate plates were calculated using Equations 2 and 3, respectively.

$$y\max_s = \frac{\alpha q W^4}{Et^3} \qquad \text{(eq 2)}$$

$$y\max_c = \frac{3qR^4(1-v^2)}{16Et^3} \qquad \text{(eq 3)}$$

Wherein q is the uniform load per area, W is the side length of the square plate, E is the young's modulus, a is an empirically derived constant form the flexural rigidity and the Poisson ration v (0.4) with a value of 0.00138, t represent the total thickness of the composition, and r is the radius of the circular plate. The µPEMs can be a composite laminate, having an assembly of layers. For example, there can be a thin film layer of Parylene C and a thin film layer of metal. Therefore, it must be taken into account that the young's modulus of the composite changes, to a two-phase composite. Two materials are weighted by the modulus based on the composite material fraction as shown in Equation 4:

$$E_{ef}=E_A(\phi_A)+E_B(\phi_B) \quad \text{(eq 4)}$$

Wherein $E_A$ represents the young's modulus of material A, $E_B$ represents the young's modulus of material B, $\Phi_A$ is the volume fraction of material A, $\Phi_B$ is the volume fraction of material B. The new effective young's modulus can be substituted into equations 2 and 3 to obtain a better approximation for the maximum deflection of the membrane composite.

The maximum deflection is equal to the force divided by stiffness. Therefore, once the maximum deflection is calculated, the stiffness coefficient k can be determined as the applied force F divided by the maximum deflection. Being that F equals to q, the general equations for stiffness of square and circular µPEMs are shown in Equations 5 and 6, respectively:

$$K_s = \frac{E_{ef}t^3}{\alpha W^2} \quad \text{(eq 5)}$$

$$K_c = \frac{16\pi E_{ef}t^3}{3R^2(1-v^2)} \quad \text{(eq 6)}$$

Equation 1 can then be substituted as shown in Equations 7 and 8 for square and circulate plates, respectively.

$$\sum F_s = \frac{\varepsilon W^2 V^2}{2(d-x)^2} + \frac{E_{ef}t^3}{\alpha W^2}x = 0 \quad \text{(eq 7)}$$

$$\sum F_c = \frac{\varepsilon \pi R^2 V^2}{2(d-x)^2} + \frac{16\pi E_{ef}t^3}{3R^2(1-v^2)}x = 0 \quad \text{(eq 8)}$$

It is therefore possible to calculate the pull-in voltages for square and circular shape structures, substituting x with (1/3)D and solving for the voltages, as shown in Equations 9 and 10, respectively:

$$vpi_s = \sqrt{\frac{82E_{ef}t^3d^3}{27\alpha\varepsilon W^4}} = \sqrt{\frac{8K_sd^3}{27\varepsilon W^2}} \quad \text{(eq 9)}$$

$$vpi_c = \sqrt{\frac{128E_{ef}t^3d^3}{81\varepsilon R^4(1-v)^2}} = \sqrt{\frac{8K_sd^3}{27\varepsilon\pi R^2}} \quad \text{(eq 10)}$$

Figure 11A:
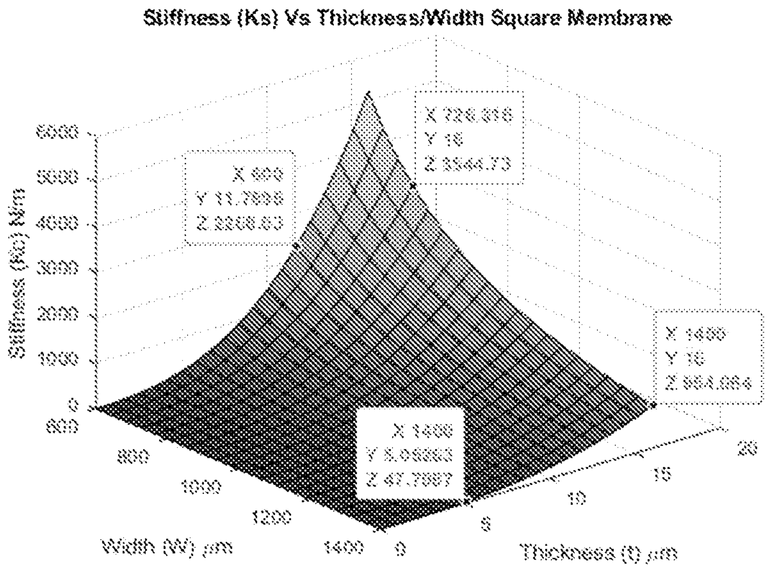
FIG. 11A is a three-dimensional map of the stiffness model result for square-shaped membrane actuators.
Figure 11B:
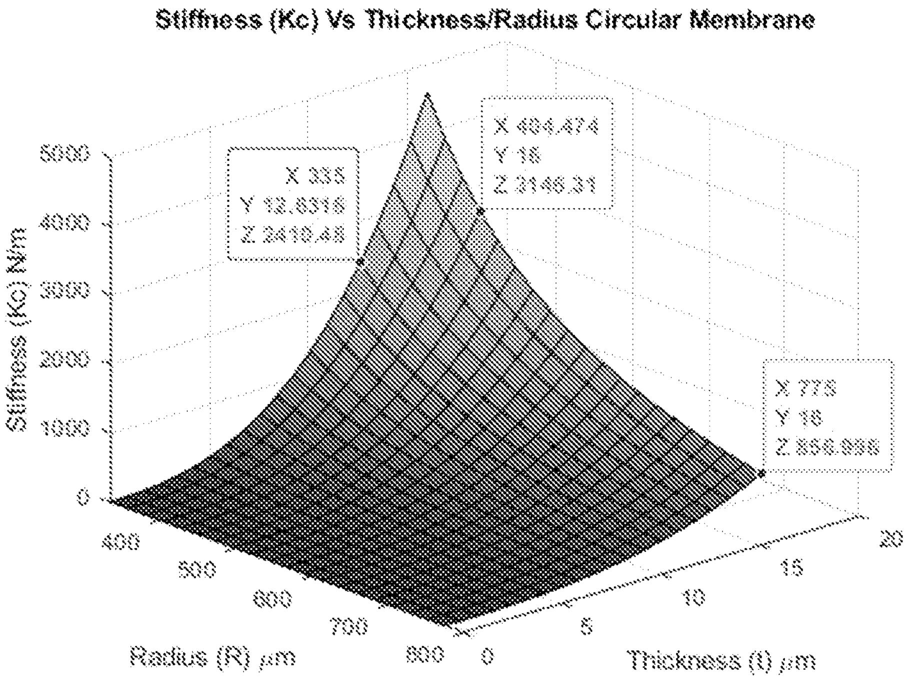
FIG. 11B is a three-dimensional map of the stiffness model result for circular-shaped membrane actuators.
Figure 12A:
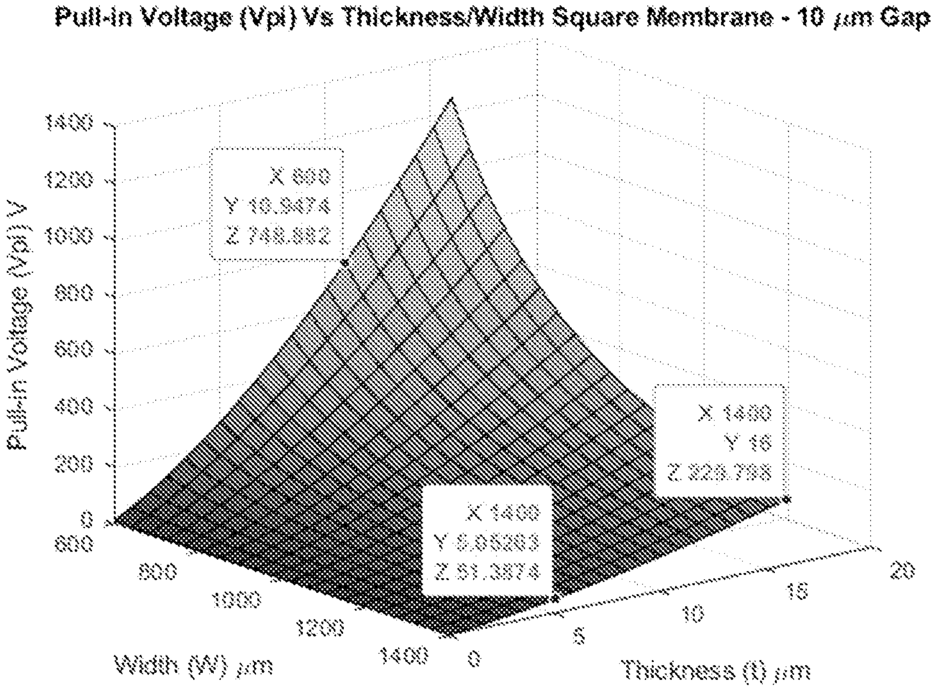
FIG. 12A is a three-dimensional map of the pull-in voltage model result for square-shaped membrane actuators with a 10 micron gap.
Figure 12B:
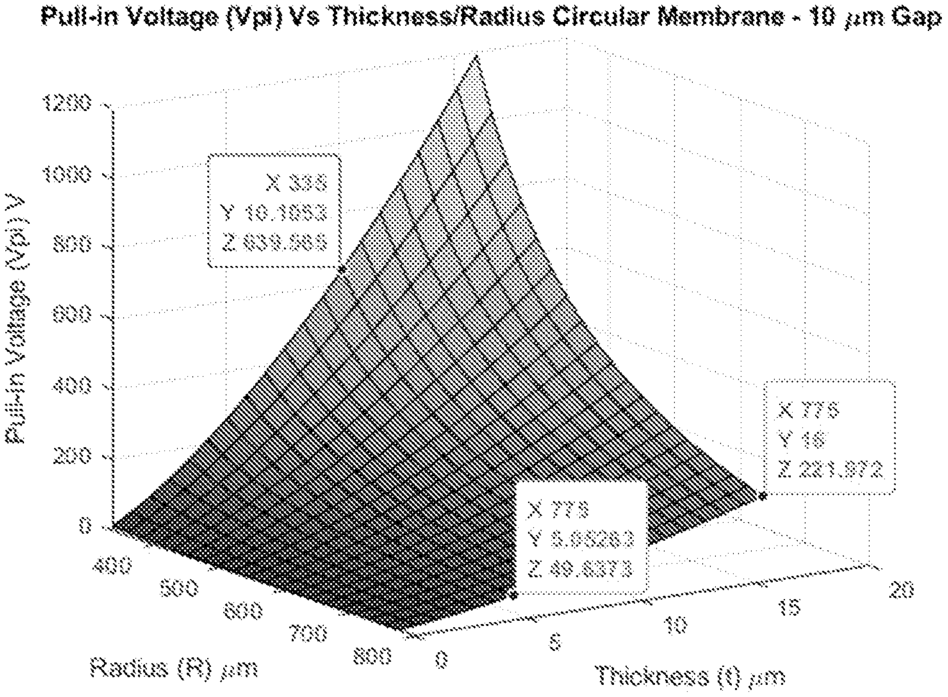
FIG. 12B is a three-dimensional map of the pull-in voltage model result for circular-shaped membrane actuators with a 10 micron gap.
Figure 13A:
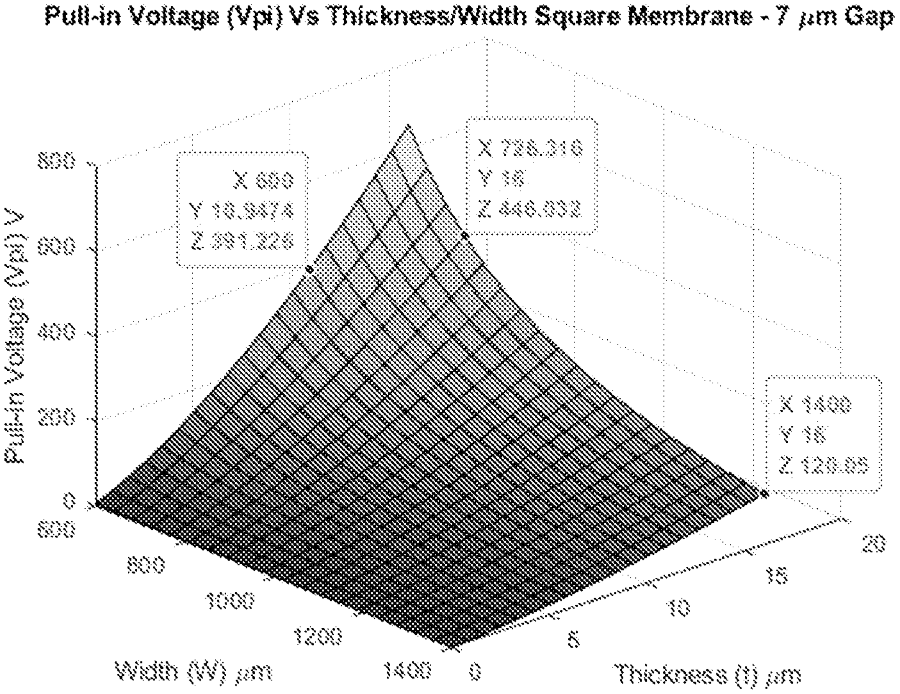
FIG. 13A is a three-dimensional map of the pull-in voltage model result for square-shaped membrane actuators with a 7 micron gap.
Figure 13B:
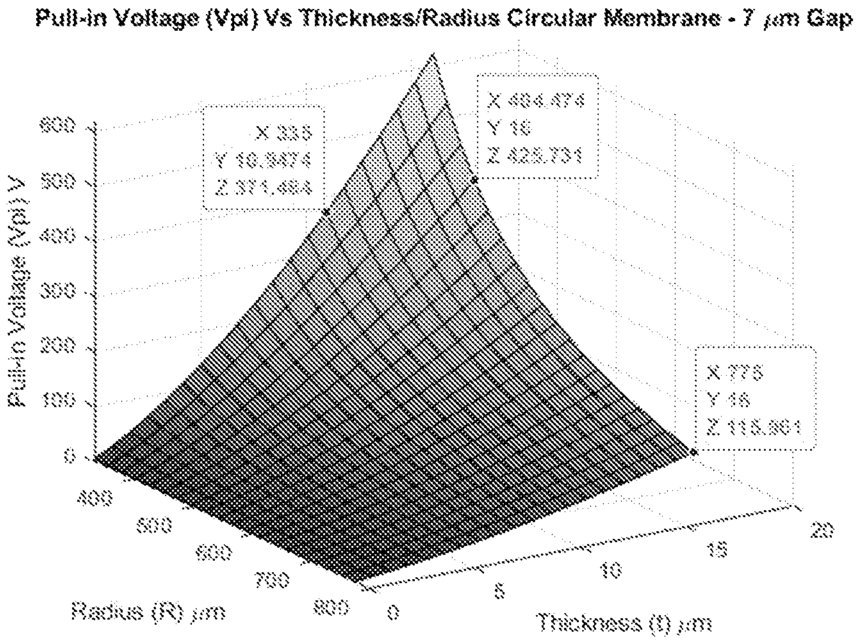
FIG. 13B is a three-dimensional map of the pull-in voltage model result for circular-shaped membrane actuators with a 7 micron gap.

Referring to FIGS. 11-13, analytical models were generated using the foregoing equations in MATLAB and the solutions were plotted in 3D heat maps (Stiffness and Pull-in voltages). The results from the 3D heat maps demonstrated that circular actuators require less voltage as compared to similarly sized (surface area) square shaped actuators. The comparison of similar size (surface area) is performed as the width of the square membrane needs to be 1.8 times bigger than the radius of the circular membrane to have proportional surface areas. However the stiffness was observed to decrease as the dimension of the structure increased in both cases. The stiffness was found to be approximately 100 N/m higher in square shaped structures than in circular ones. For various applications, square shaped applications can be better suited. The square membranes have more rigid stiffness, which can be useful when patterning structures on top of it, such as microfluidic structures, networks, and designs. Additionally, increasing the dimension of the microsystem decreases the voltage needed to actuate it, making it more practice and feasible for Lab-On-A-Chip and System-On-A-Chip applications.

The devices and systems of the disclosure can be used for various applications. For example, the devices and systems can be Lab-on-chip/System-on chip devices for various applications including, but not limited to, growth of strain sensitive cells, in vitro models for studying strain and/or stress induced damage on cells, cell sorting devices, and micromixing devices. Another application includes ink-jet printing. Method of using the system can include introducing a fluid sample into the microfluidic structure and applying a voltage between the top and bottom electrodes to actuate the membrane and thereby introduce a force into the fluid sample affecting the flow of the sample and/or inducing a stress and/or strain into the sample. The sample can include for example cells. The methods can further include introducing to or more fluid samples into the microfluidic structure for example for mixing applications and/or for methods in which interactions of samples is being studied.

Devices and systems of the disclosure can be used for growth and differentiation of strain sensitive cells such as bone cells (osteoblasts and osteocytes), and for the further investigation of Mesenchymal stem cells (MSCs) which are known to be adult stem cells that are isolated from different sources and have the potential to differentiate into other type of cells.

In another potential application, the devices and systems can be used as an in vitro model device, for example, such as for further studies of brain injury models or strain induced diffuse axonal injury. Designs of membranes such as the cantilever design, microbridge design, and the four individual electrodes design described herein can be used for actuation and cause strain, stress, and damage within the microfluidic structure to cultured brain cells and axons, to study brain injury models and strain induced diffuse axonal injury within them. Controlled actuation and deflection can be of enormous importance and relevance within the study of in vitro brain injury models.

Systems and devices of the disclosure can be used to sort cells or particles within its microfluidic structure. Solid-fluid interaction of the device/system under mechanical actuation could be utilized for cell sorting. This also could be performed while the device/system is under mechanical resonance and at its different mechanical resonances (known as mechanical resonance modes), separating particles or cells due to focusing of the particles/cells due to their interaction with the flow field.

Devices and systems of the disclosure can be used as a micromixer device. As fluids are perfused through the microfluidic structure, the membrane is deflected to disrupt the flow profile to enhance mixing within the device. In addition, actuation of the membrane at its different mechanical resonance modes can be used to create fluid circulation within the microfluidic structure to enhance mixing between the co-infused streams.

The use of Parylene in devices of the disclosure can advantageously provide biocompatibility while also being compatible with microfabrication tools, processing, and technologies. Devices of the disclosure can demonstrate continuous actuation (static actuation) and dynamic actuation capabilities. Continuous actuation was observed in the devices of the disclosure using a probe station with a mounted video camera to observe the devices under test.

The actuation pull-in voltages of the devices of the disclosure closely matched theoretical calculations which can allow modeling tools to be used for design and characterization specific to a microsystem application.

EXAMPLES

Example 1

Figure 9:
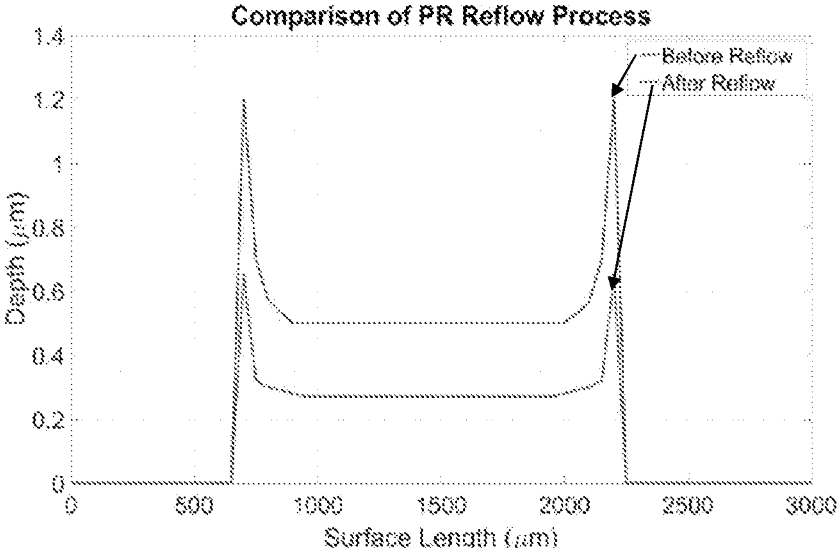
FIG. 9 is a graph showing the measurement of planarization of the photoresist inside the micromachined cavity. Photoresist reflow improved the overall planarization by reducing the step height above the substrate surface. The zero microns reference represents the substrate level. The sharp peaks at the edges of the feature are due to profilometry measurement response at abrupt height changes at the edge of the cavity.

A device in accordance with the disclosure was fabricated using a combination of bulk and surface micromachining with vapor-deposited Parylene films as a structural material and positive thick photoresist as a sacrificial material for defining the polymer membrane over cavity (gap) and the patterning and structural definition of the microfluidic channel network within the microsystem. A cavity recess was first defined using $XeF_2$ bulk micromachining using an Xetch silicon etching system (XACTIC Inc., Pittsburgh, PA). Next a ground electrode was defined at the bottom of the cavity via liftoff process consisting of lithographic patterning (EVG 620 Mask Aligner, EV Group) of a high resolution positive photoresist (Shipley S1818, Marlborough, MA) followed by Physical Vapor Deposition of a thin Cr/Au film (PVD75, Kurt J. Lesker, Glassport, PA) and dissolution of the Cr/Au covered photoresist mask in acetone. The electrode was then passivated with a thin Parylene film deposited via Chemical Vapor Deposition (Labcoter 2 PDS 2010, Special Coating Systems, Indianapolis, IN). The cavity was then planarized using a thick AZ9260 photoresist (IMM, Argyle, TX) via spin coating at the appropriate spin rate (Headway Research Inc., Garland, TX). To further improve the planarization of the photoresist, a reflow approach was followed via heating the substrate on top of a hot plate at 130° C. for several minutes. Referring to FIG. 9, better planarization was confirmed via surface profilometry (Dektak 3ST, Veeco, Planview, NW).

Figure 10A:
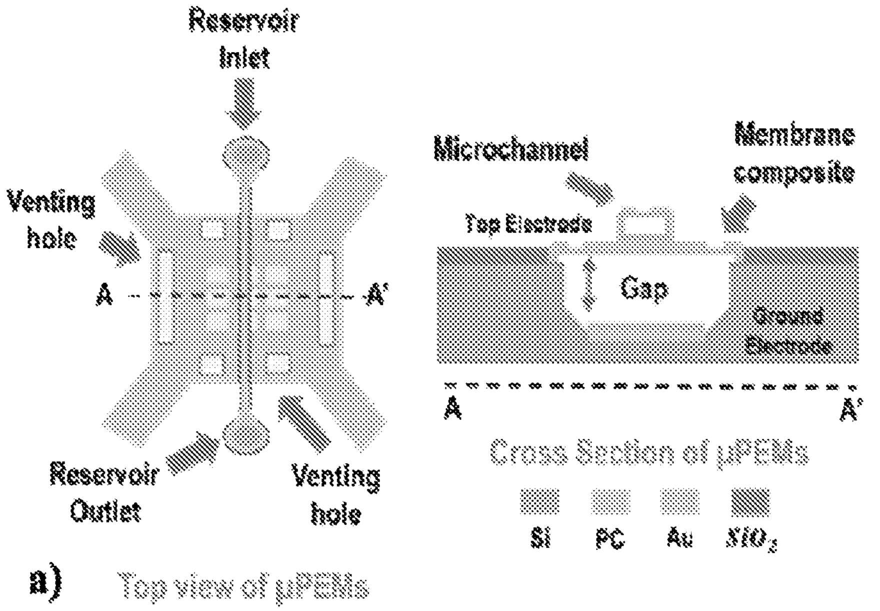
FIG. 10A is a schematic illustration of devices in accordance with the disclosure.

Following planarization, another layer of Parylene was deposited on top of the photoresist filled cavity, forming the first bottom layer of the membrane. Cr/Au electrodes were defined via liftoff and sandwiched between Parylene films as a membrane laminate that had a 1300 $\mu m^2$ area to allow electrostatic actuation over the membrane actuator as a microshell using a sacrificial thick positive photoresist layer (AX9260) defined prior to the final Parylene deposition. The Parylene layers were etched in an $O_2$ plasma via Reactive Ion Etching (Mini-Lab Plasma-Pod System, Gilroy, CA) to open venting holes in the membrane, electrode interconnects, and microfluidic reservoirs. The completed microsystem was released in isopropanol alcohol via the membrane venting holes and microfluidic channel openings as a freely supported structure with embedded microfluidic channels (FIG. 10A). FIG. 10A shows the devices, which were fabricated using surface and bulk micromachining of silicon dioxide coated wafers, such as dry silicon etching to create a gap between Au electrodes, Parylene deposition and photoresist patterning for structure and sacrificial material, respectively.

Figure 10B:
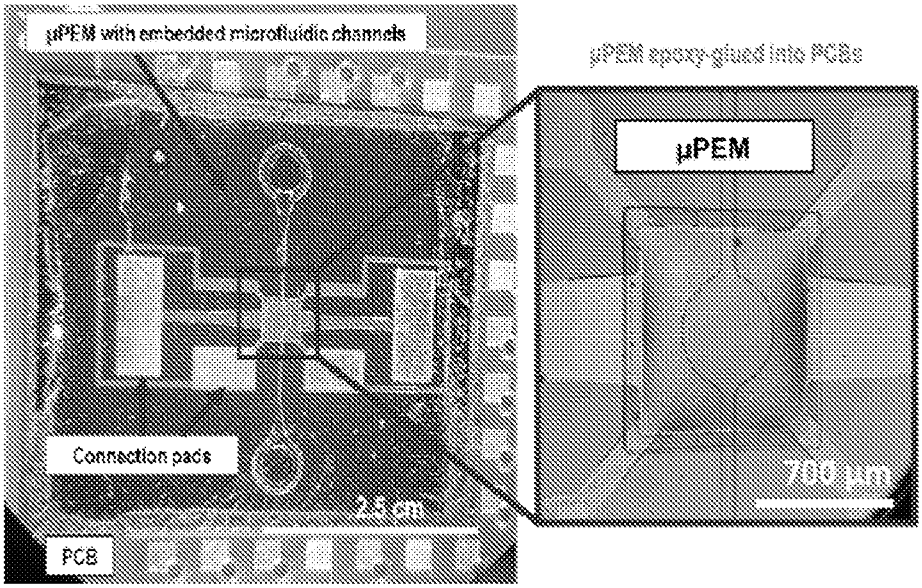
FIG. 10B is a photograph of a device in accordance with the disclosure after fabrication.

Microsystem packaging: Wafers were inscribed and laser-cut into individual dies (Epilog Zing Laser Cutter, Golden, CO) and the μPEMs were glued using EPO-TEK 301 adhesive (Epoxy Technology, Billerica, MA) onto predesigned PCBs (Advanced Circuits, Aurora, CO) for easy handling and characterization. FIG. 10B shows the pPEMS after fabrication is completed. Venting holes allowed access to the sacrificial photoresist layer under the membrane and reduced air damping while the device was under actuation.

Figure 5:
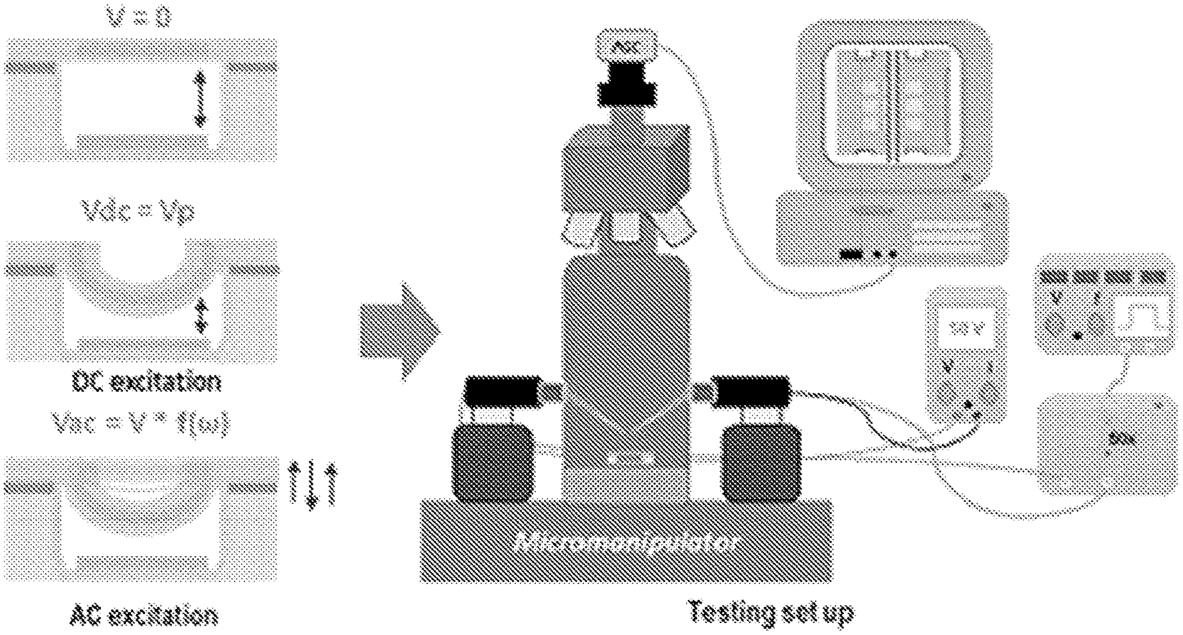
FIG. 5 is a schematic illustration of a testing step-up for characterization of membrane deflection used in the example.

Testing and Characterization: Devices were excited using a DC power supply (Circuit Specialists, Tempe, AZ) and a function generator (Siglent, Shenzhen, China) with a 50× amplifier (TEGAM, Geneva, OH); the membrane deflection was observed via a probe station set up (Micromanipulator Co., Carson City, NV). Devices mounted on the PCBs were placed on the probe station plate and secured via a vacuum chuck for the appropriate wiring connection for electrical excitation and characterization of the MEMS devices. The probe station set up also included a mounted video camera (Point Gray Camera, FLIR systems, Inc., Billerica, MA) positioned orthogonally to the device under test as shown in FIG. 5 FIG. 5 also includes a schematic of membrane actuation ($V_{DC}$ and $V_{AC}$).

Figure 8A:
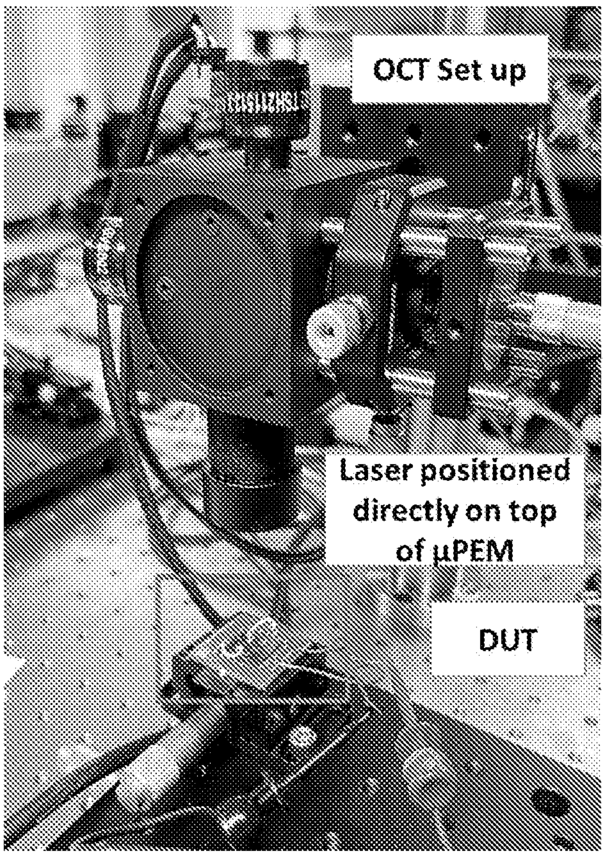
FIG. 8A shows an Optical Coherence Tomography (OCT) reflectometry setup.

For dynamic motion measurements of the μPEMs, phase-sensitive optical coherence tomography (OCT) was used. The custom-built spectral-domain OCT system has a center wavelength (A) of 1325 nm and bandwidth of 100 nm, ad an A-line (sampling) rate of 28.3 kHz. The OCT sample arm beam was focused on the device surface as shown in FIG. 8A, the reference beam was focused on the separate stationary mirror, and the phase of the measured signal returning from the sample surface was measured over time. This raw phase [−π, π] was unwrapped (T) and then converted to displacement (z) according to $z=\varphi\lambda/(4*\pi)$ for plotting. The standard deviation of 4000 displacement measurements, acquired from a stationary mirror was 13 nm, representing the resolution limit for the OCT quantification. In particular, this OCT system has bene used to determine and study the cross-sectional view of various tissue samples, such as skin and their respective layers. However, the system can also measure dynamic motion, oscillatory movement, and displacement from the MEMs device under test while driven with AC excitation and a 50× amplifier.

Membrane thickness from 5 μm to 16 μm were tested. Microfluidic channels of the devices were 10 μm to 20 μm in height and electrode gap distances of 7 to 10 μm were used. μPEMs were excited with a DC power supply to determine Pull-in voltages that ranged from 56 to 125 $V_{DC}$ (Table below), which closely matched theoretical calculations.

| Thickness of membrane | Gap | Theoretical Pull-In Voltage | Experimental Pull-in Voltage (μ ± σ) | N |
|---|---|---|---|---|
| 5 μm | 10 μm | 52 V | 56 ± 2 V | 12 |
| 5.5 μm | 10 μm | 58 V | 68 ± 2 V | 12 |
| 6 μm | 10 μm | 66 V | 87 ± 4 V | 12 |
| 7 μm | 10 μm | 79 nm | 94 ± 3 V | 12 |
| **Thickness of membrane with microfluidic channels** | **Gap** | **Theoretical Pull-In Voltage** | **Experimental Pull-In Voltage (μ ± σ)** | **N** |
| 14 μm | 7 μm | 100 V | 104 ± 4 V | 12 |
| 15 μm | 7 μm | 110 V | 113 ± 2 V | 12 |
| 16 μm | 7 μm | 120 V | 125 ± 3 V | 12 |

Figure 6:
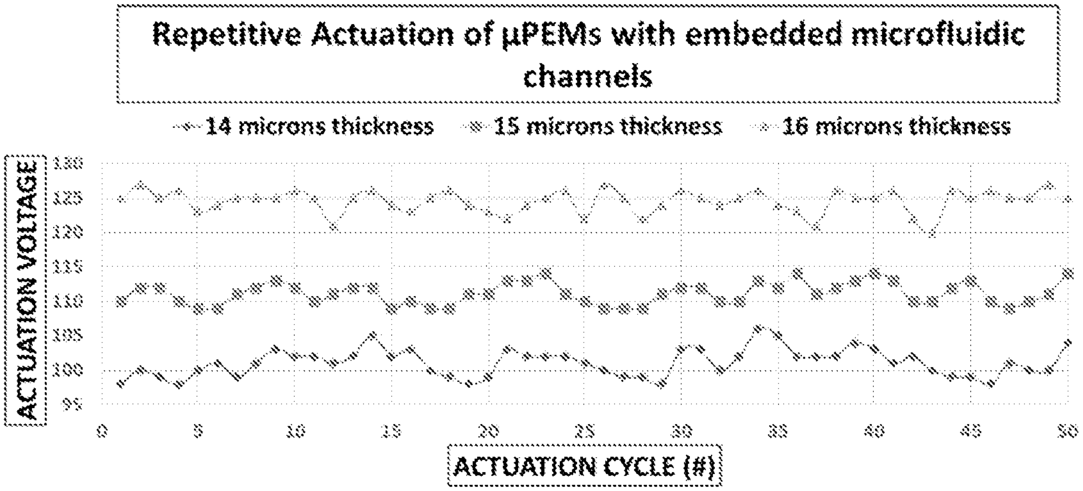
FIG. 6 is a graph showing repetitive actuation of the membrane in a device of the disclosure.

Repetitive actuation of the microsystem indicated minimal voltage shifts between cycles <6% with respect to the mean (FIG. 6).

Figure 7:
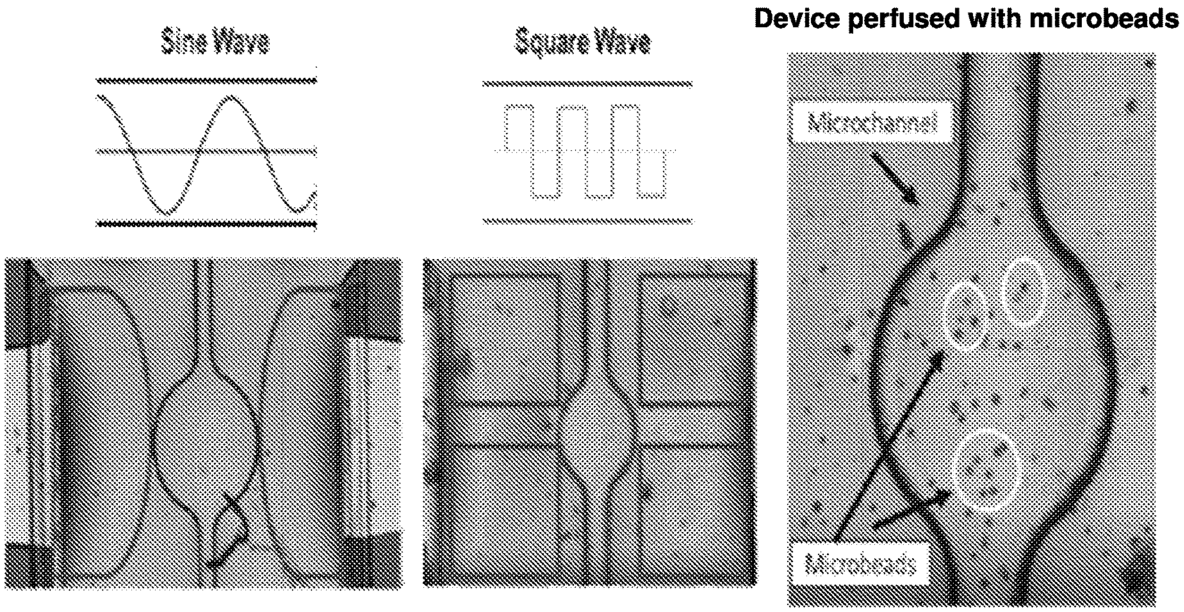
FIG. 7 is optical images of devices under actuation from an AC signal (sinusoidal and square) showing microbead mixing.

Referring to FIG. 7, microbeads were introduced into the microfluidic channels and AC excitation was used to actuate the membrane. When microbeads were introduced into the microfluidic channels, AC excitation created deflection patterns within the μPEMs, enhancing fluid circulation within the microchannels FIG. 8A shows a closer look at the μPEMs within the OCT reflectometry setup. The device under test was positioned at the middle of a movable stage with double sided tape. The laser beam pointed directly on the center of the μPEMs devices.

Figure 8B:
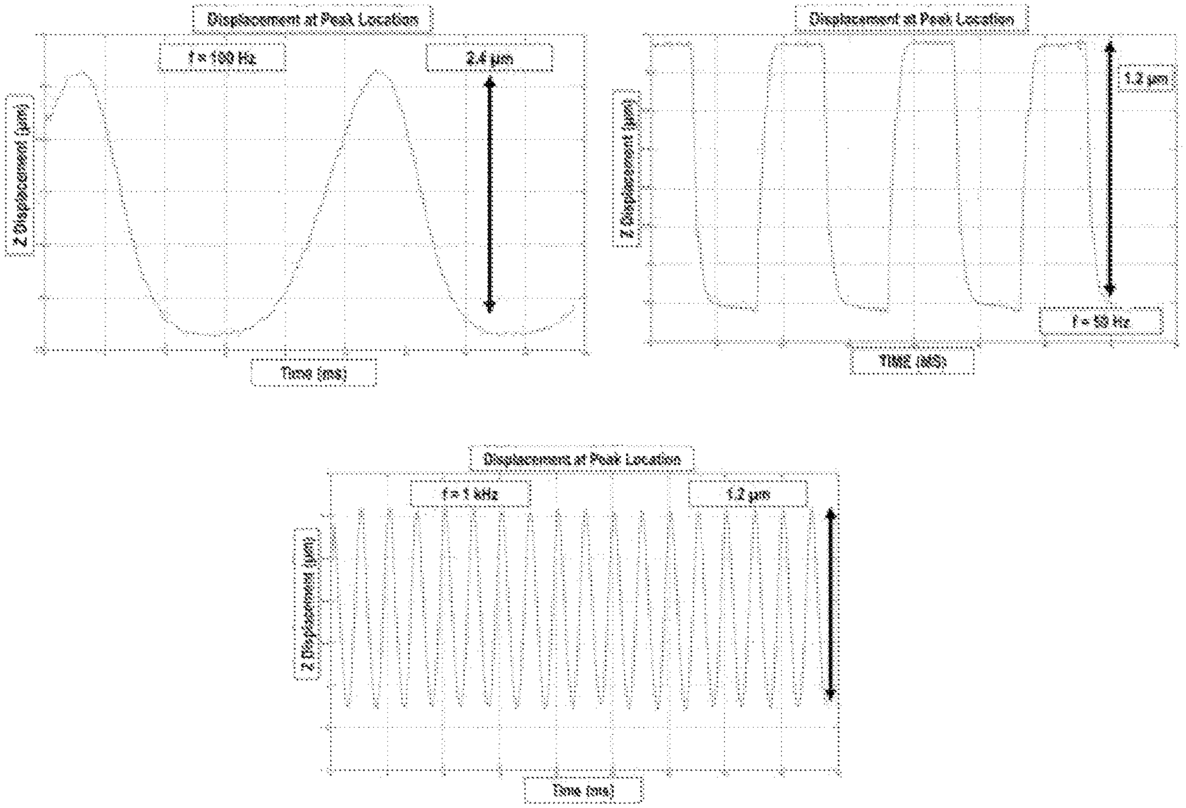
FIG. 8B includes the associated graphs showing dynamic displacement after applying sine and square waves with 1.5 Vpp and 800 mV DC-bias with a 50× amplifier. Membranes were demonstrated to oscillate at low and high frequencies. Greater displacement was noticed at lower frequencies due to time-reaction of the membranes.

Referring to FIG. 8B, μPEMs were excited with sinusoidal and square waveforms with 1.5 Vpp and 800 mV DC-bias amplified 50× through the amplifier at different frequencies of 50, 100, and 1000 Hz, with the membrane deflection amplitudes quantified using the OCT reflectometry approach.

The measured deflection amplitudes were 2.4 μm at 50 Hz, 1.2 μm at 100 Hz and 1.2 μm at 1000 Hz, respectively.

Example 2

A silicon dioxide coated waver (University Wafer, Boston MA) with a 500 nm thermal oxide film was spin coated with a high resolution positive photoresist (Shipley S1818, Kayaku Advanced Materials, Wesborough MA) on both sides of the wafer (polished and unpolished sides) as a way to protect the backside from further wet etching steps. The photoresist was spin coated at 4000 rpms (Headway Research Inc., Garland, TX) and baked on a hot plate for 1 minute and 20 seconds at 115° C. The backside was baked for 3 minutes to keep it there as a protective mask. For the next step using a first microfabrication mask, opening windows for the cavity were patterned using standard lithographic techniques (EVG 620 Mask Aligner, EV Group) on the front side of the wafer. After the lithographic exposure and development, windows remained open on the wafer substrate, exposing the silicon dioxide on the front side of the wafer. A HF wet etching was pursued in order to remove the silicon dioxide and exposed the bare silicon within the windows. A 10:1 HF solution (J. T. Baker, VWR, Philadelphia, PA) was used to etch the exposed silicon dioxide, wafers were submerged within the HF solution for 10 minutes, rinse several times in DI water and dry by a nitrogen gun. Open windows exposing the silicon were achieved, ready for the silicon etching step. For the micromachining of the cavity, a chemically assisted and dry isotropic etch approach was implemented. The recess was defined using $XeF_2$ bulk micromachining technique using a Xetch silicon etching system (XACTIC Inc., Pittsburgh, PA).

Figure 14:
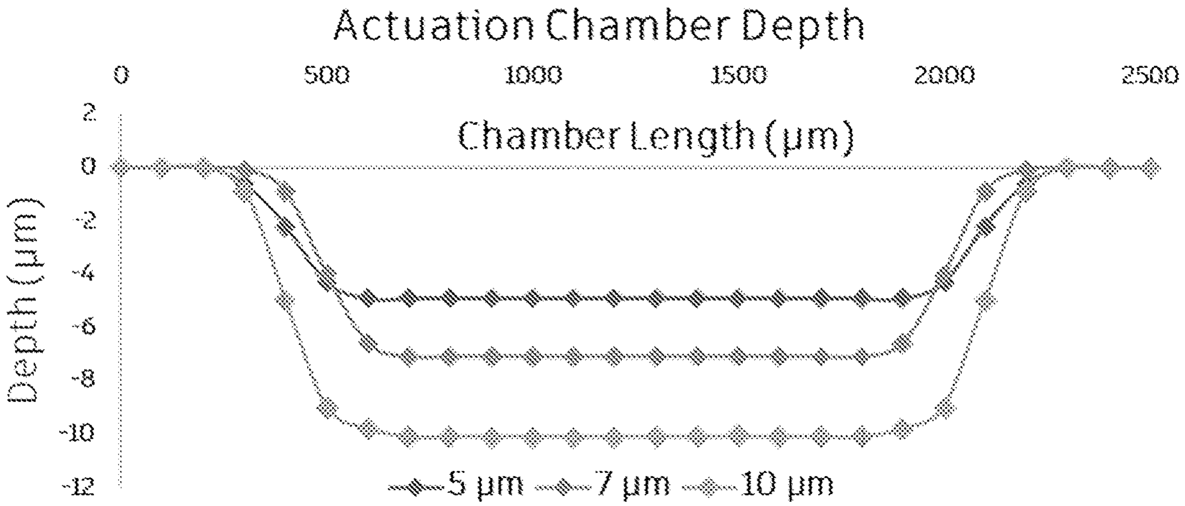
FIG. 14 is a graph showing surface profilometry measurements of different actuation chambers depths of devices in accordance with the disclosure.

The best etching recipe conditions were 2.5 Torr $XeF_2$ and 3 Torr N2 for 60 seconds per etching cycle, providing an etching rate of approximately 1.216 μm. Several different etch depths for the actuation chamber with a smooth surface were obtained with this recipe, such as the ones shown in FIG. 14. Measurements of the depths were performed using a surface profilometry instrument (Dektak 3ST, Veeco, Plainview, NY). Depths ranging from 5 to 10 μm were within the range of adequate gap distance for a practical actuation voltage.

Wafers were clean and the photoresist mask in front and backside were stripped off. After this step, wafers were prepared for further Parylene C thin film deposition. The wafers were prepared with a silane solution A-174 (Special Coating Systems, Indianapolis, IN) which promotes the adhesion of Parylene to Si and glass substrates. After the A-174 preparation, the wafers were loaded into a chemical vapor deposition coater (Labcoter@ 2 PDS 2010, Special Coating Systems, Indianapolis, IN). A 1-3 μm thin film of Parylene C was deposited in a way to smooth the surface from the bottom of the cavity and prepare the microstructures for further patterning and deposition of metal thin films for the definition of the ground electrode. For this step, a second lithographic mask was used, defining the ground electrode at the bottom of the cavity, including the respective electrical connections and traces coming from the bottom of the cavity to the in-plane surface of the wafer.

Figure 15:
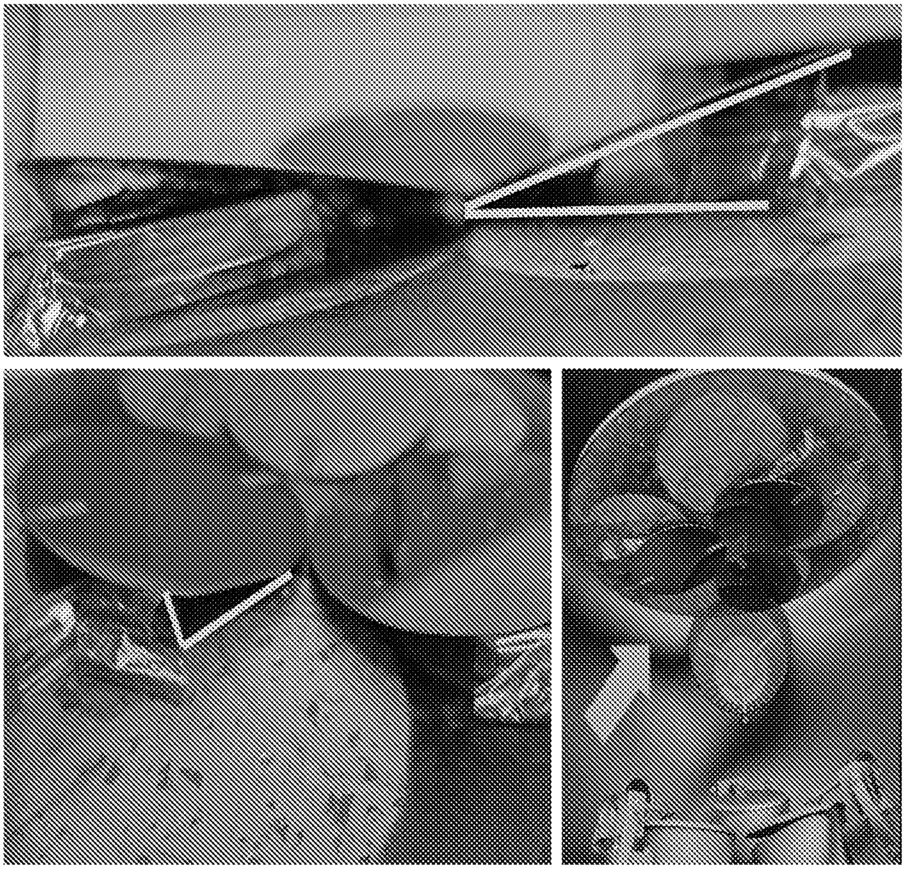
FIG. 15 is a photograph showing inclined or tilted deposition approach for the metal thin film deposition for the grown electrode microfabrication.

In order to patterned this bottom electrode, thick positive photoresist AZ9260 (IMM, Argyle, TX) was spun into the wafer, the selection of the thick photoresist was due to the topography of the features, in addition to allowing for a better patterning inside the micromachined cavity. After the developing step, devices were discum to further clean any residual debris inside an $O_2$ plasma generator/asher (Nordson March PX-250 Plasma Etch Asher System, Carlsbad, CA) at 100 W for 60 seconds. In order to deposit metal thin films to define the ground electrode, wafers were loaded into the platen in a tilted position inside of the deposition chamber from the sputtering equipment (PVD75, Kurt J. Lesker, Glassport, PA) as observed in FIG. 15. The tilted approach was followed due to the loss of continuity within the electrical traces at the edge of the cavity. The trace tended to break, crack or not being connected at all, making the ground electrode unusable. Tilted deposition [improved the overall continuity and the deposition in the edge where there was a height transition.

The metal deposited for the patterning of the electrode, started with a thin layer of Cr (~30 nm) as an addition layer, then a layer of Au was deposited (200 nm). After the deposition of the metal thin film was completed, the electrodes were defined via lift off process, removing the non-patterned areas with multiple prolonged dips in acetone and further rinses with DI water. A new layer of Parylene C was deposited to insulate the ground electrode. The actuation chamber and ground electrode were defined. The actuation chamber was then filled out and planarized.

Figure 16A:
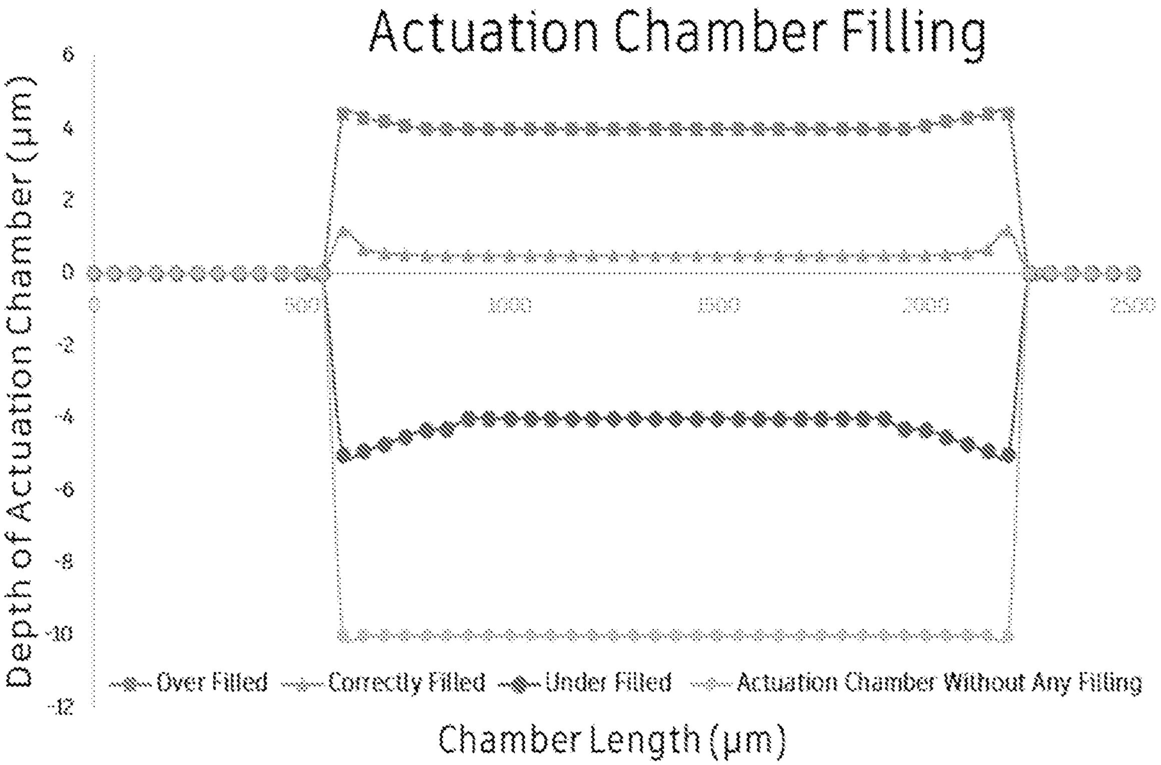
FIG. 16A is a graph of surface profilometry measurements for the actuation filling step showing possible outcomes: over filled, correctly filed, and under filled, as well as an actuation chamber with no filling.
Figure 16B:
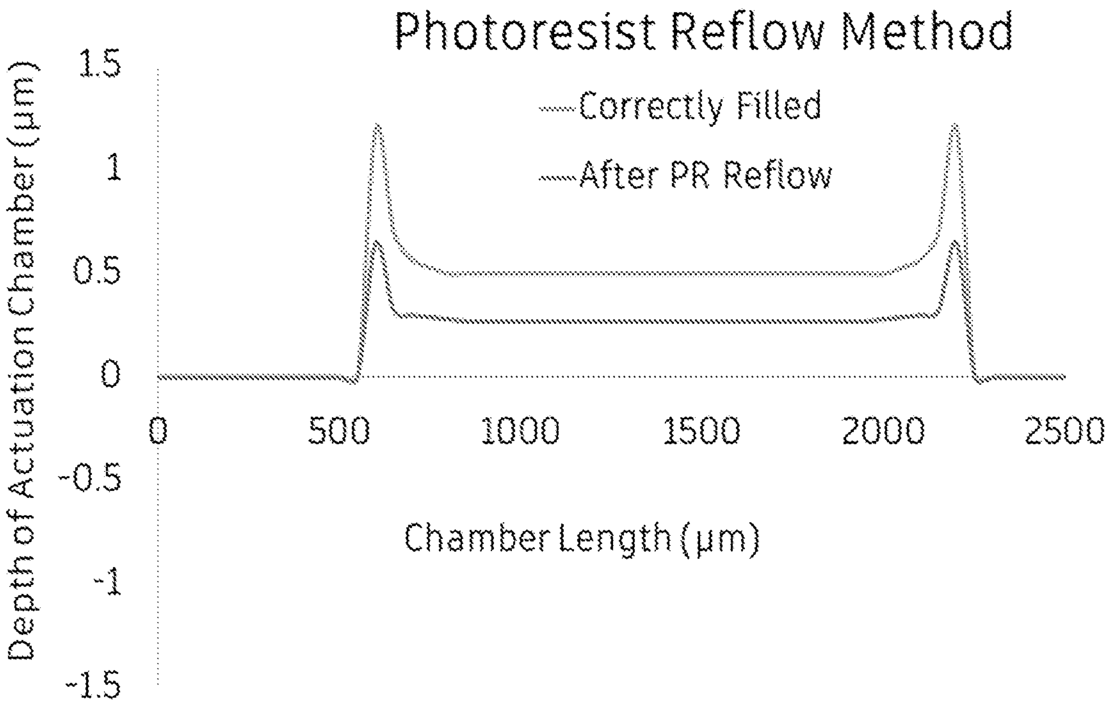
FIG. 16B is a graph of surface profilometry measurements for the actuation filling and reflowing process to improve the planarization of the filling of the photoresist.

The cavity was planarized using thick positive photoresist AZ9260 (IMM, Argyle, TX) via spin coating at the appropriate spin coating rate. Selection of the spin rate was important for proper filling of the cavities due to the complex topography. An appropriate recipe was achieved for the filling of the chamber. After the spin coating, with a third lithographic mask the actuation chamber photoresist filling is patterned and developed. The bulk photoresist film is patterned within the boundaries of the actuation chamber, so that is the only photoresist film that will remain within the substrate. After the development of the photoresist, if the actuation chamber is not filled properly, there are three possible outcomes, under filled, over filled, and properly filled as shown in FIG. 16A. The properly filled outcome results in a minimal overfilling of around ~0.6 μm. Therefore, a reflowing method was followed to reduce the final height to 0.2-0.3 μm. The reflowing approach consists of soft baking the wafers in a hot plate after the developing. The soft bake required for the photoresist reflow was at 110° C. for 5 minutes. Results of the reflow method can be observed in FIG. 16B.

Figure 17:
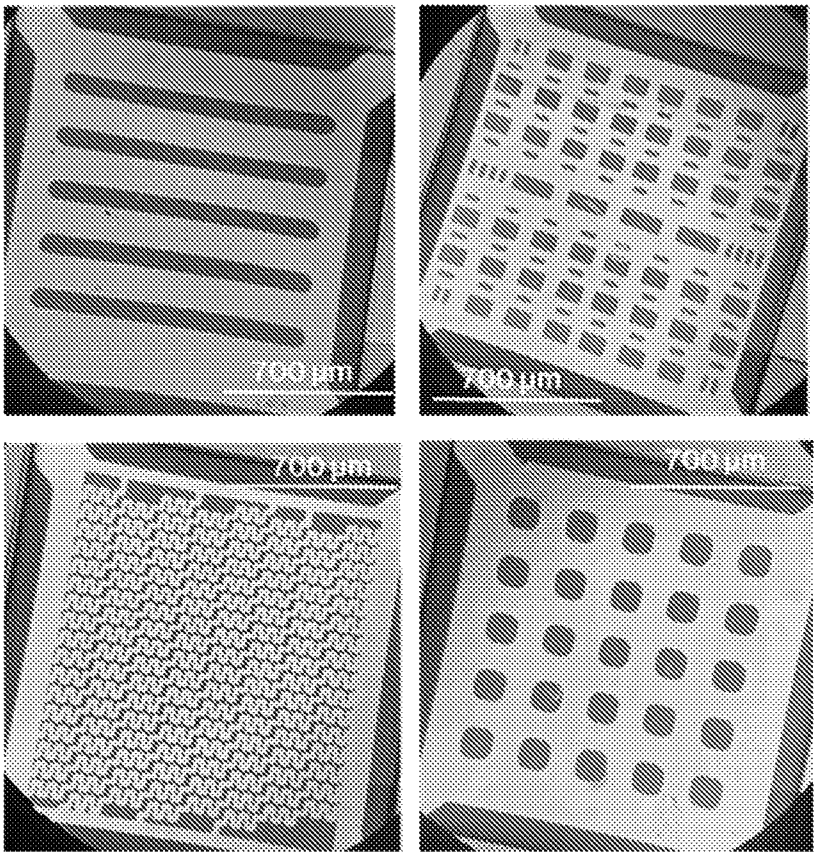
FIG. 17 is a photograph of examples of top electrodes patterned on top of a membrane actuation in accordance with the disclosure.

After achieving the adequate height and planarization, the next step was to cover the actuation chamber with another layer of Parylene C. The thickness of this layer was around 1 μm, and was applied in a way to smooth the topography for the next fabrication step. A fourth mask was used, patterning the actuation electrode using again a positive photoresist (Shipley S1818, Kayaku Advanced Materials, Westborough, MA), metal thin film sputtering via PVD and lift off process to define the electrodes. FIG. 17 shows examples of finalized top electrodes.

Another 1 μm film of Parylene C was deposited on top of the newly defined electrode, in a way to sandwich the electrode between Parylene C films, insulating the electrode from the upcoming microstructures, such as the microfluidics. A fifth mask was used to define and patterned the microfluidic channels and architectures on top of the membrane actuator. The definition of the microfluidic channels was achieved using the same thick positive photoresist (AZ9260, IMM, Argyle, TX) used previously for the actuation chamber filling. This photoresist was spin coated twice, to achieve a total height of approximately 20 μm. The photoresist acted as the sacrificial layer of the microfluidic channel architectures after the structures were finalized.

After the definition of the microfluidic channel architectures the wafers required a Parylene C film roughening procedure. This roughening allowed the thin films to increase their adhesion between Parylene C layers, avoiding delamination of the films in further steps. The roughening process was completed using an O2 plasma generator/asher (Nordson March PX-250 Plasma Etch Asher System, Carlsbad, CA) for two 1 minute cycles at 100 W. The spaced cycles were performed to avoid ashing of the sacrificial photoresist while under plasma. The purpose was to only roughen the Parylene film to improve the adhesion between layers. After the roughening process, a new layer was deposited via CVD. The thickness of this layer varied according to the microsystem design, commonly a 3 to 5 μm thick layer was deposited, due to the compatibility with the no delamination process. Thinner layers are more prompt to delaminate even with the plasma roughening treatment. Final microsystem overall thickness after this step ranged from 5 to 20 μm. A μPEMs device with an embedded microfluidic channel can be observed in FIG. 18.

Figure 18:
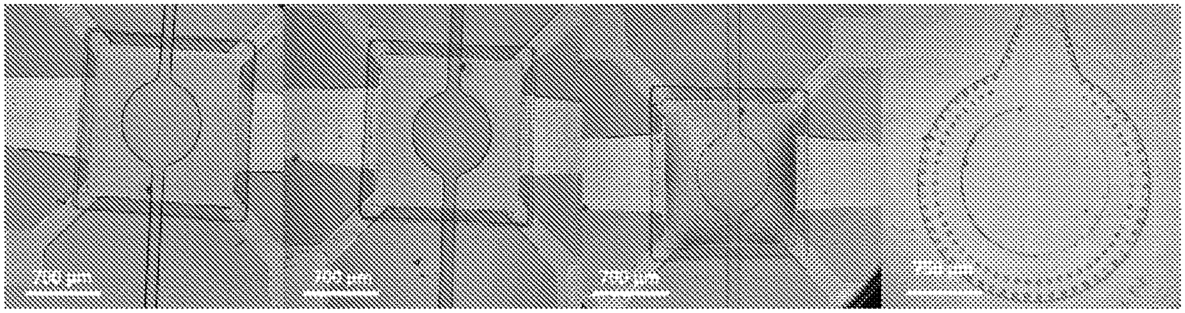
FIG. 18 are images of different top view from µPEMs in accordance with the disclosure and a top view of a microfluidic chamber reservoir.

The last and 6$^{th}$ mask of this microfabrication process consist of the definition of a protective photoresist mask for the final etching of the Parylene C within specific areas to be removed, such as the microfluidic ports/reservoirs, electrical pads and membrane venting holes. This photoresist mask, commonly known as an etching mask, protected areas that were not to be etched. The etching mask was patterned with a thickness twice of the overall thickness of the microsystem, therefore a thick positive photoresist was used (AZ9260, IMM, Argyle, TX). The etching selectivity between Parylene C and photoresist was approximately 1:1. For that reason, having an etching mask twice the total thickness protected the areas that were not desired to be etch. The etching process was carried out via $O_2$ plasma etching using a Reactive Ion Etcher (Mini-Lab Plasma Pod System, Plasma-Therm LLC., St. Peterburg, FL). Oxygen plasma or RIE etching is a known method to remove Parylene C within polymer micromachining processes. The etching was carefully monitored to limit overheating of the etching mask. Overheating can cause a reflowing of the photoresist mask within the opening areas, not permitting further etching of the Parylene C exposed areas. It was observed that RIE conditions that avoided mask reflow were a power of 50 watts, 80 mTorr pressure and etching cycles of 10 minutes with a 5 minute thermal breaks between each cycle to cool down the wafers. This resulted in good etching and avoidance of mask reflow as seen in FIG. 18.

Figure 19:
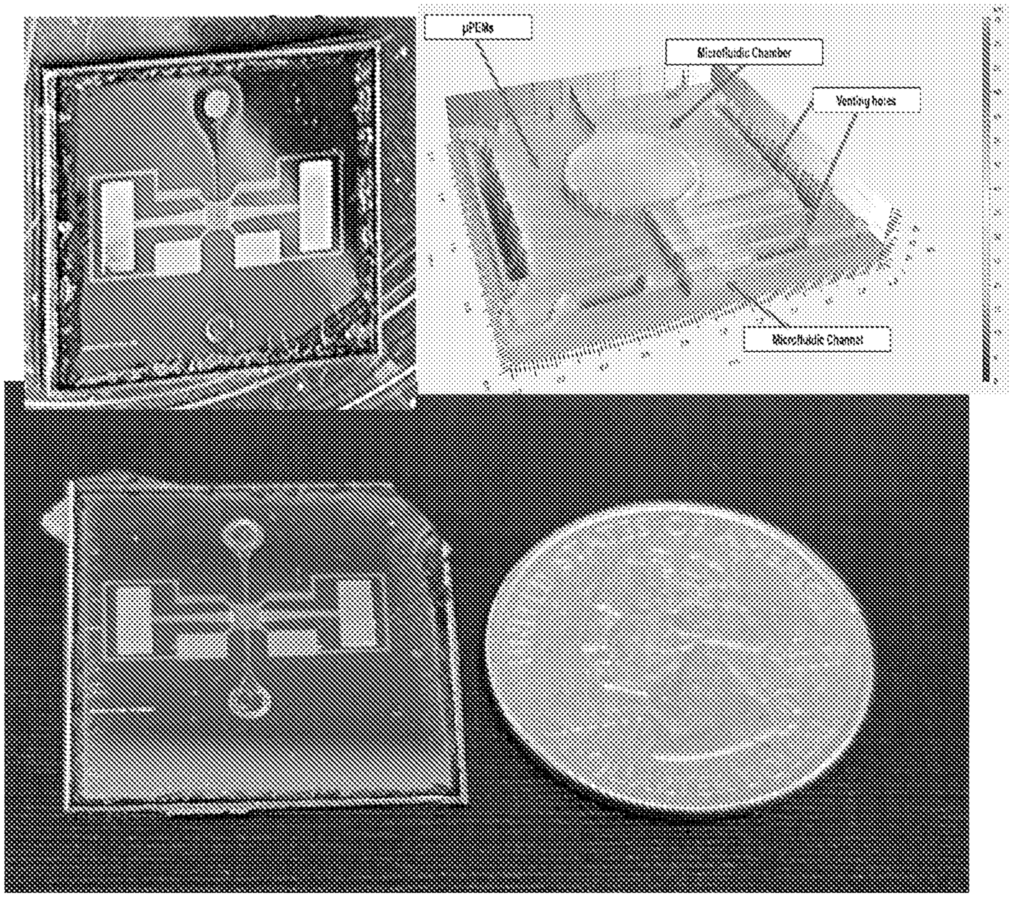
FIG. 19 includes images of µPEMs with a size comparison using a U.S. quarter and a three-dimensional map of the topography of the µPEMs device.

After the fabrication process was complete, wafers were cleave and diced in a precision scriber tool (PELCO FlexScribe, Ted Pella, Redding, CA). Wafers were cleaved in individual dies for further structure releasing and packaging. Schematic of the dicing process, an example of a MEMS die and a dimension comparison of a μPEMs device with a US quarter is shown in FIG. 19.

Figure 20:
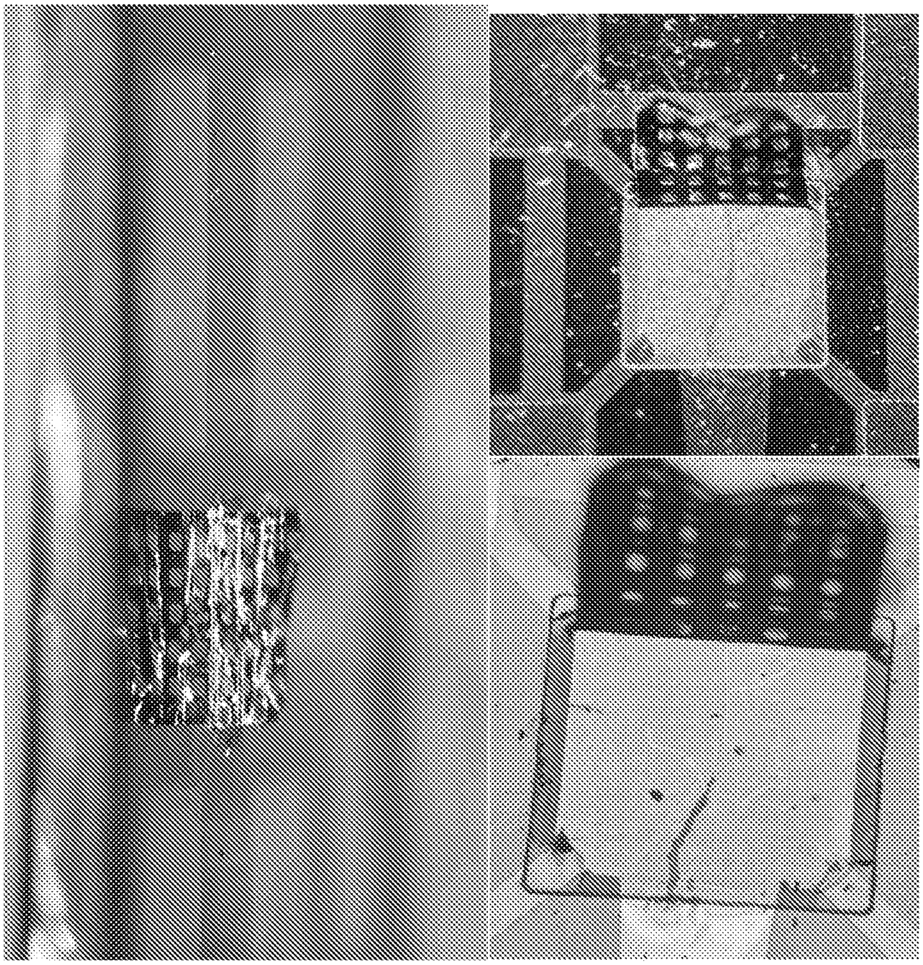
FIG. 20 includes images of a µPEMs in accordance with the disclosure having the membrane peeled off, a top view showing the membrane peeled off, and the group electrode at the bottom of the actuation chamber.

MEMS dies were released using continuous acetone and IPA baths to remove sacrificial material under the actuation chamber via the venting holes and microfluidic architectures via the microfluidic reservoirs. Complete removal of the photoresist within the structures took up to 2 to 3 days as a result of the continuous thermal heating while the whole microfabrication process was being complete. After the photoresist was completely strip off from the μPEMs, the devices were air-dry overnight, then put inside an convection oven at 65° C. for 30 minutes to completely dry any residue of liquid between the microstructures. A finalize topography of the μPEMs with embedded microfluidic channels was obtain using a surface profilometer with 3D mapping capabilities (KLA Tencor P7, KLA, Milpitas, CA) to observe the freely supported microstructure. 3D map as shown in FIG. 20 in addition to peeling off one of the membranes from one of the μPEMs device to observe the actuation chamber beneath.

After having individual MEMS die, the microsystems were ready to be package for further testing and handling. μPEMs with and without embedded microfluidic channels were epoxy glued using EPO-TEK 301 adhesive (Epoxy Technology, Billerica, MA) onto predesigned PCBs (Advanced Circuits, Aurora, CO). Epoxy was carefully spread on the back of the μPEMs dies and placed on the PCBs to bond. The devices and PCBs were left overnight inside a convection oven at 65° C.

Figure 21:
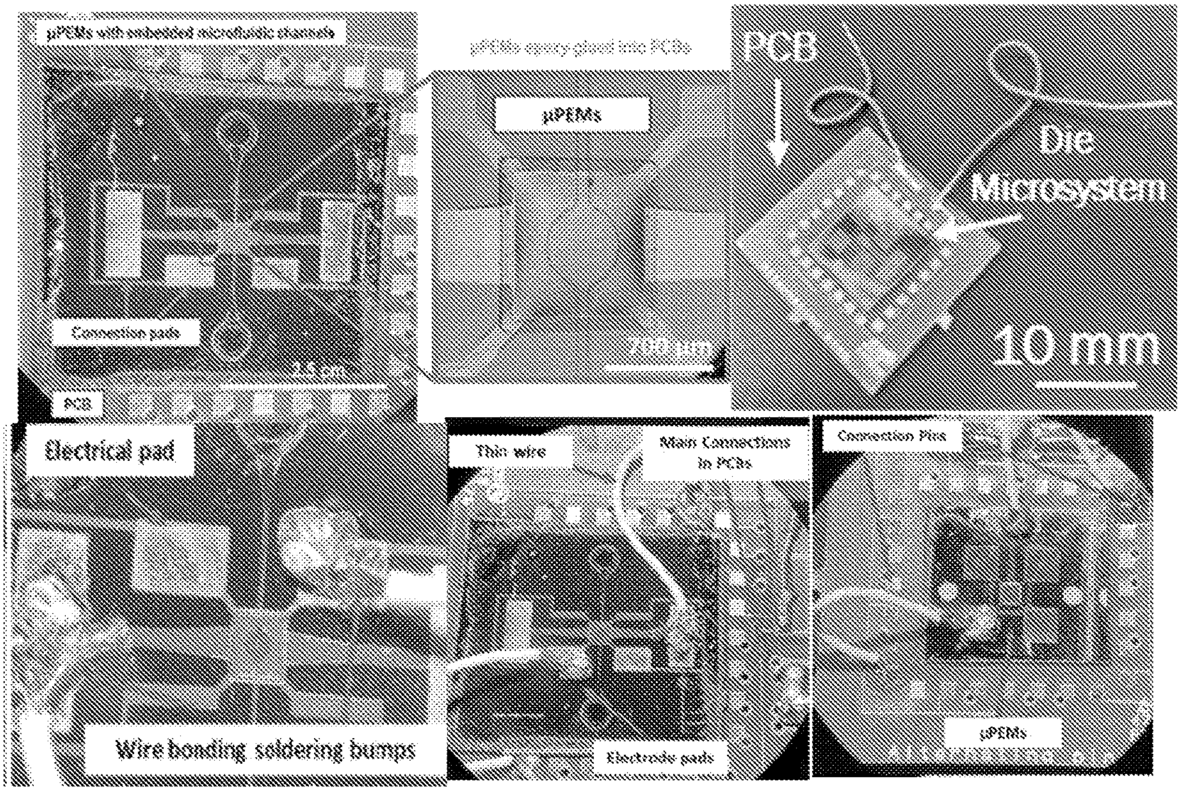
FIG. 21 includes images of µPEMs devices packaged in predesigned PCBs, the process of bonding and soldering bumps for wiring is shown in the images.

Referring to FIG. 21, for the wiring of the devices with the PCB, a typical soldering iron bonding technique was followed. A thin wire was utilized for the interconnections between the electrode pads and the PCB pins. The soldering iron with a little amount of tin was directly placed on top of the electrical pad to generate a bump. The other end of the wire was directly placed in close contact with the bump, while the bump started melting the cable was quickly slid in, generating a connection between the pads and the pins.

The μPEMs devises were tested with the application of direct current voltage to the device to determine the experimental pull-in voltage needed to activate the membrane. Repeatability and reliability of the activation of the membrane was also evaluated. Referring to FIG. 5, probe station set-up (Micromanipulator Co., Carson City, NV) was utilized. Devices packaged and mounted on the PCBs were placed on the probe station platen and secured via a vacuum chuck during the wiring connection for the testing. Devices were excited using a DC power supply (Circuit Specialists, Tempe, AZ). The membrane deflection was observed via a video camera (Point Gray Camera, FLIR Systems Inc., Billerica, MA) that was mounted on the probe station via a c-mount. The camera was positioned orthogonally to the devices under test. To achieve the highest field of view available, a 5× microscope lens (5× microscope lens, Mitutoyo Corporation, Kawasaki, Japan) was utilized.

Figure 22:
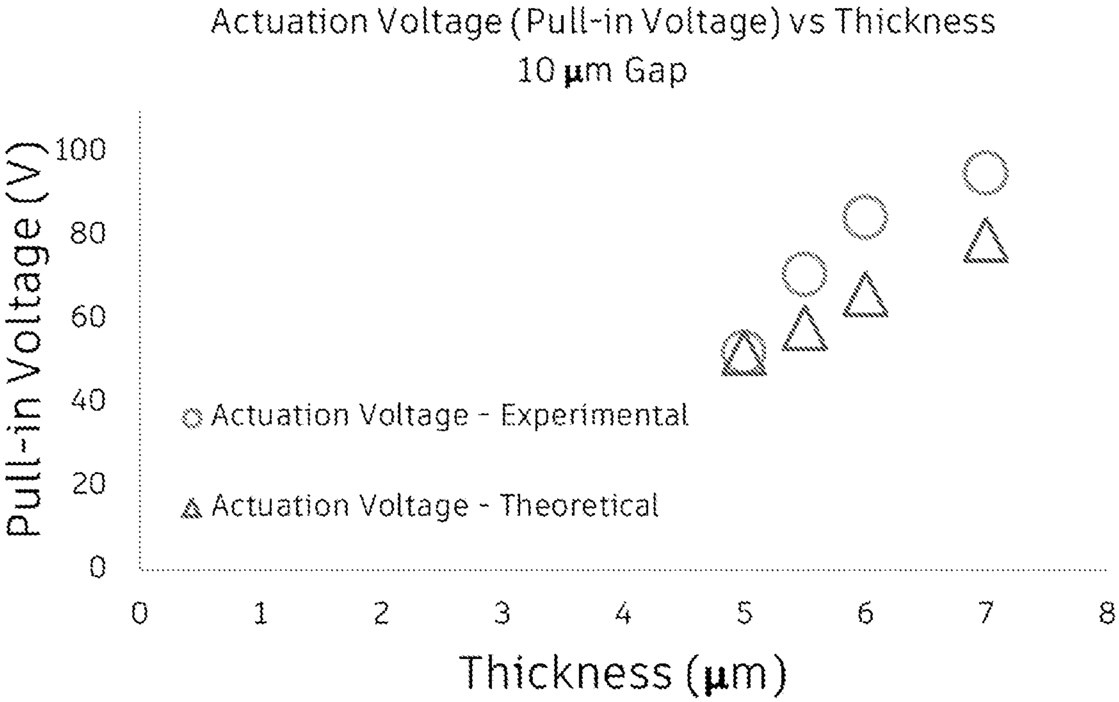
FIG. 22 is a graph of experimental and theoretical pull-in voltages for different thicknesses of µPEMs with a 10 µm depth actuation gap. The devices tested did not include embedded microfluidic channels.
Figure 25:
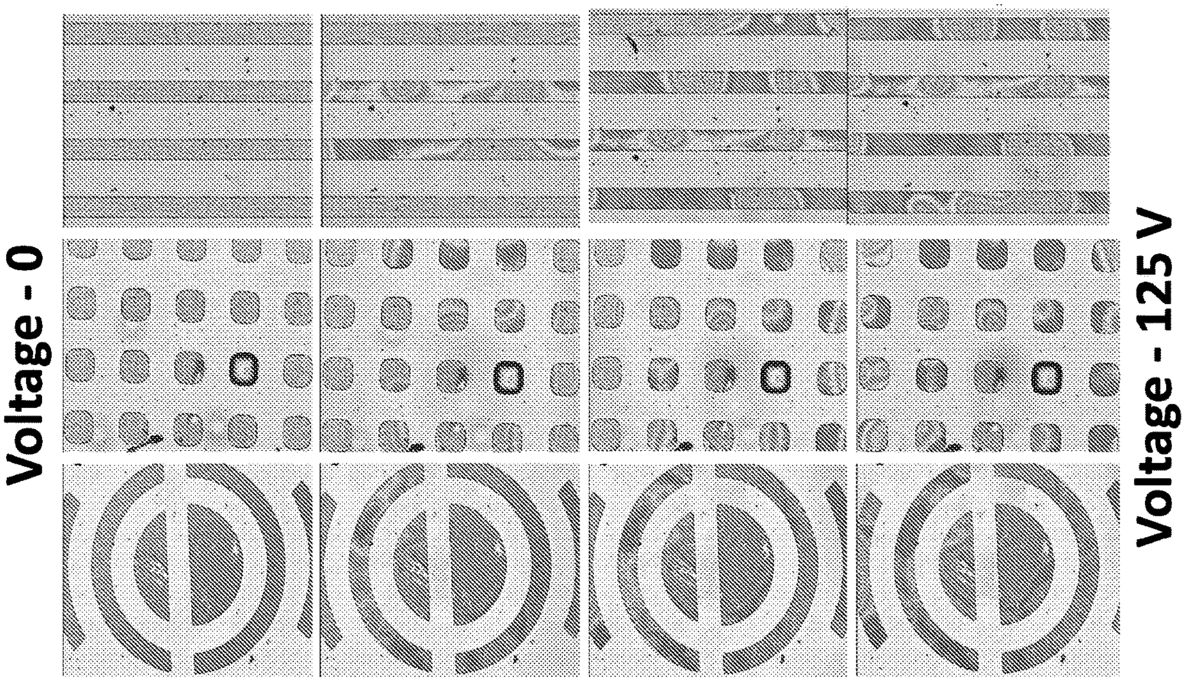
FIG. 25 is an image showing actuation behavior voltage is applied and increased form an initial 0 Volts to 125 V for µPEMs with different top electrode designs.

The μPEMs were connected to a single voltage supplier, voltage was applied within the systems ranging from 0 to 125.5V, which was the maximum voltage output from the voltage supplier. While voltage was applied to the microsystems, it was performed in small increments of 1 volt at a time, to visualize the actuation of the membrane while the voltage was increasing. Referring to FIG. 25, when the applied voltage approximated to the pull-in voltage of the structure, the membrane started to deflect downward, then when the applied voltage was greater than the pull-in voltage, the membrane completely collapsed towards the bottom of the actuation chamber. The µPEMs did not include embedded microfluidic architectures and have different top electrode designs, which did not affect the membrane for evaluation and testing purposes. As seen, these deflections were visually appreciated by interference patterns, which indicate areas where the membrane transitioned from a free-standing to a pulled down position.

µPEMs without microfluidic architectures with a total thickness of 5 µm to 7 µm, and a gap distance of 10 µm were evaluated and tested. Experimental voltage results ranged from 56 volts to 94 volts. FIG. 22 and the table below show the results of the actuation test and a comparison with theoretical pull-in voltages.

| µPEMs without embedded micro fluidic channels | Theoretical pull-in voltage | Experimental pull-in voltage (µ ± σ) |
|---|---|---|
| 5 µm | 52 V | 56 ± 2 V |
| 5.5 µm | 58 V | 68 ± 2 V |
| 6 µm | 66 V | 87 ± 4 V |
| 7 µm | 79 V | 94 ± 3 V |

Voltage differences between the theoretical and experimental pull-in voltages are expected due to fabrication factors that affect the devices, such as variation in actuation chamber depths per microsystem, and total thickness of the membrane due to the low controllability from the deposition of thinner Parylene C layers below 3 rim. Additionally, conditions of the CVD tool may deposit slightly thicker layers, which can affect the final membrane thickness.

Figure 23:
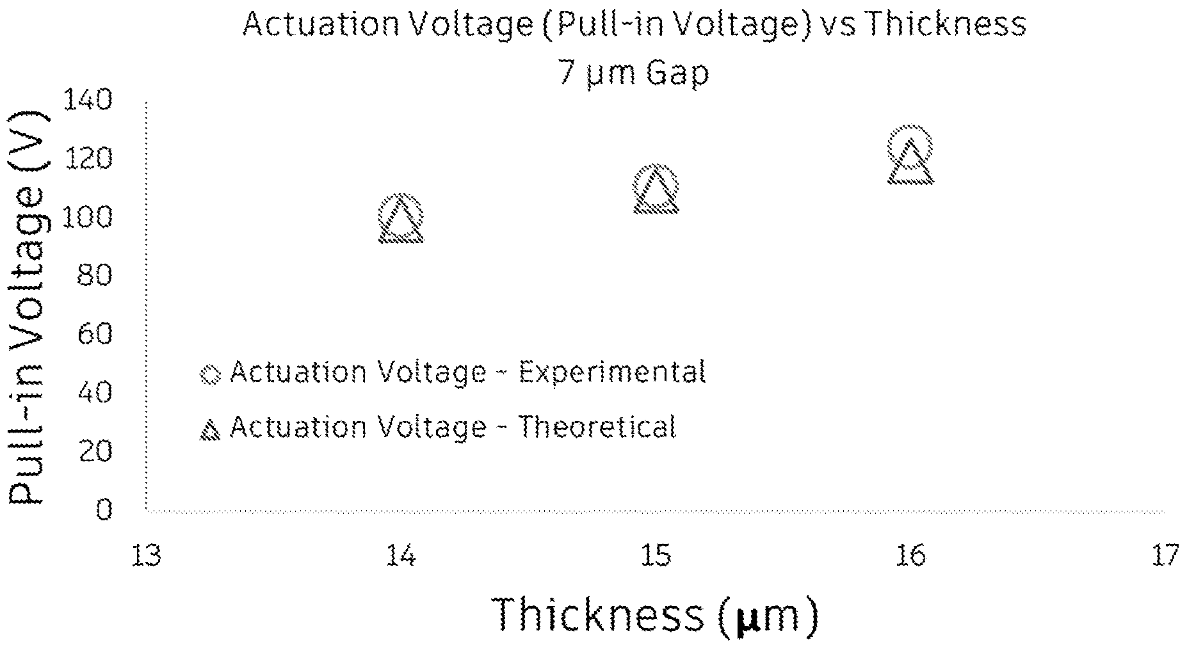
FIG. 23 is a graph of experimental and theoretical pull-in voltages for different thicknesses of µPEMs with a 7 µm depth actuation gap. The devices tested included embedded microfluidic channels.
Figure 24:
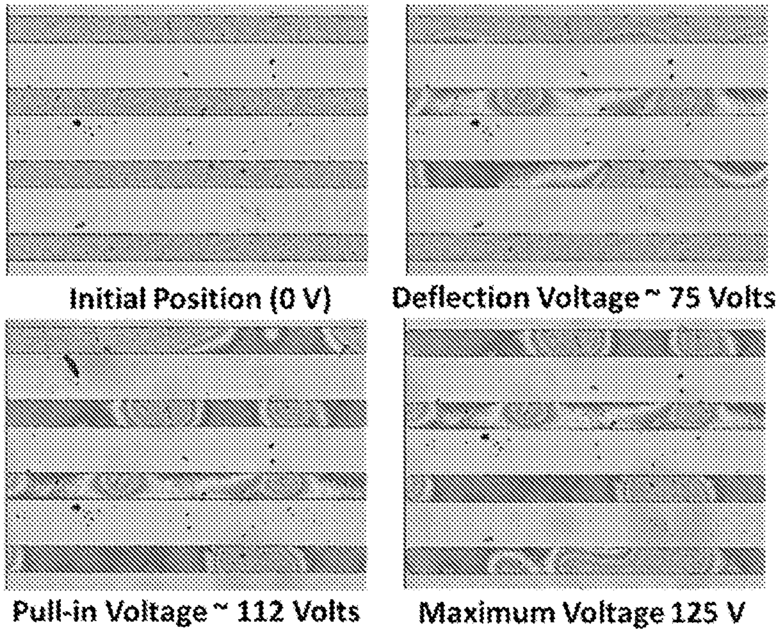
FIG. 24 is an image showing actuation behavior as voltage is applied and increased for µPEMs with a 15 µm thickness

The µPEMs with embedded microfluidic channels was also evaluated. The microsystem had a reduced actuation chamber gap between electrodes of 7 µm to compensate for the total thickness of the microsystem, due to the addition of the microfluidic architectures. Total thickness of the microsystems ranged from 14 µm to 16 µm. Referring to the table below and FIGS. 23 and 24, the experimental pull-in voltages had less than 5% error between the theoretical and experimental pull-in voltage values.

| µPEMs with embedded microfluidic channels | Theoretical pull-in voltage | Experimental pull-in voltage (µ ± σ) |
|---|---|---|
| 14 µm | 100 V | 101.08 ± 3.91 V |
| 15 µm | 110 V | 111.16 ± 2.41 V |
| 16 µm | 120 V | 124.54 ± 2.56 V |

For all microsystems (with and without microfluidic channels), the actuation and experimental pull-in voltage remained close to the theoretical pull-in voltage, with pull-in voltage shifts relatively small between different microsystems that had similar characteristics, making it a precise and reliable platform.

Figure 26:
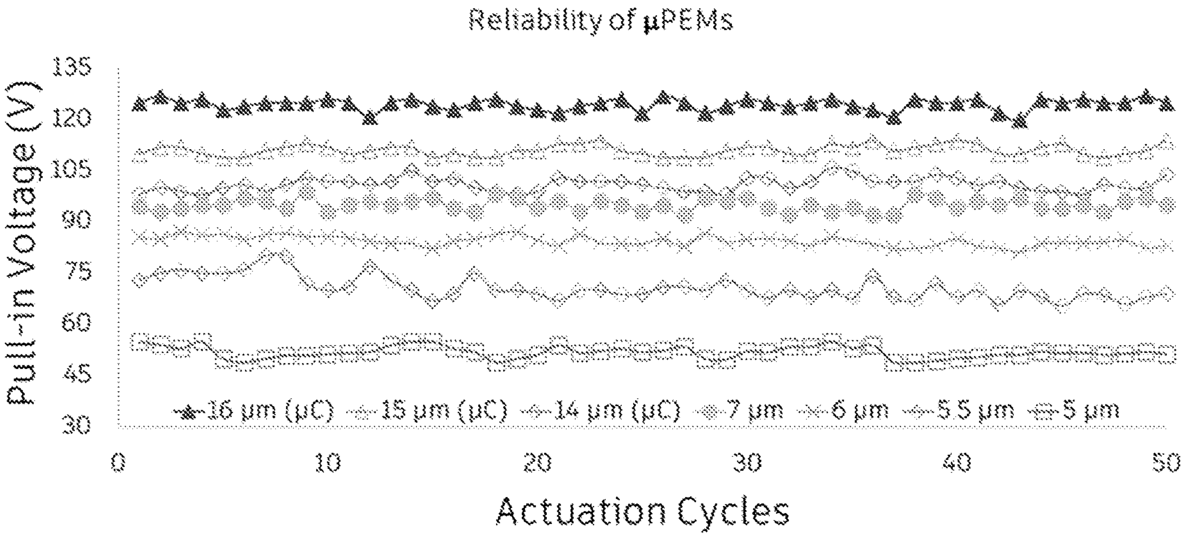
FIG. 26 is a graph showing repeatability and reliability (50 cycles) of µPEMs devices with different membrane thicknesses with and without embedded microfluidic architectures.

Reliability and repeatability are important requirements for the successful development of new Lab-On-A-Chip and System-On-A-Chip devices. A reliability test was performed on the microsystems, cycles of 50, 1 k, 10k actuation cycles were performed. The 50-actuation cycle test was performed manually for all devices, observing the deflection and interference patterns via the camera from the probe station. Then, a function generator was programmed to generate square waves every 20 seconds with similar values to the experimental pull-in voltages per microsystem. Actuation of the microsystems was continuous and repeatable, with no sign of stiction between electrodes between cycles. There was also no observed membrane actuation freezing, such a situation where the microsystem remains in the pull-down position after one actuation cycle. FIG. 26 shows the continuous actuation of the µPEMs under a reliability test for 50 actuation cycles, with and without embedded microfluidics. Minimal actuation shifts were observed over the test.

Dynamic motion or oscillation of the pPEMS was measured using optical coherence tomography (OCT). The devices were activated using alternate current voltage with different signal inputs and various driving frequencies where maximum deflection and system reaction was determined. For the dynamic motion measurements of the µPEMs a function generator (Siglent, Shenzhen, China), a 50× Amplifier (TEGAM, Geneva, OH) and a digital oscilloscope (TBS 1032B, Tektronix Inc., Beaverton, OR) to input and monitored the signals was utilized. In addition, a phase-sensitive optical coherence tomography (OCT) was used. This custom-built spectral-domain OCT systems had a center wavelength (A) of 1325 nm and bandwidth of 100 nm, and an A-line (sampling) rate of 28.3 kHz. The µPEMs were situated in a movable stage and the OCT sample arm beam was focused on the device surface as seen on FIG. 8A that shows the testing set up, the reference beam focused on a separate stationary mirror, and the phase of the measured signal returning from the sample surface and measured over time. This raw phase [−π, π] was unwrapped (φ) and then converted to a displacement (z) according to the equation $$z = \frac{\varphi\lambda}{4\pi}$$

for plotting. The standard deviation of 4000 displacement measurements obtained from a stationary mirror was 13 nm, representing a resolution limit for the OCT quantification. The system was coupled with a LabVIEW program that allowed for performing measurements and processing the data in MATLAB.

For the AC voltage inputs into the microsystems, certain parameters of the signal input needed to be take into account, such as the peak to peak voltage amplitude from the signal and the DC bias (commonly referred as offset). As discussed previously, the µPEMs have a pull-in actuation voltage, which is the actuation voltage that will pull-down the membrane to one third of the gap distance, after the pull-in voltage is reach and surpass the membrane will snap down towards the bottom of the actuation chamber. The DC voltage input within the µPEMs activates the device, and allows it to deflect. Therefore, the system requires an activation voltage in order to allow for actuation capabilities. Therefore, while AC voltage signals are input into the system, they require to have an activation voltage, in this case a DC bias or offset. The function generator was connected to a 50× amplifier and the signals came from the amplifier directly to the µPEMs.

For example, if a peak to peak voltage amplitude (Vpp) of around 1 V, and a DC bias of 1 V is applied, the overall actuation voltage after the amplification will be 100 V (50 Vpp+50 V bias). It is to be noted that exceeding the voltage limits with the combination of peak to peak voltage amplitude and bias may result in a total collapse of the membrane actuator towards the bottom of the chamber impeding its movement. Most of the collapsing was observed when an alternating signal was applied into the system, such as a sinusoidal wave which holds the voltage within the system while the positive and negative transition takes place.

Dynamic motion was tested with μPEMs system with embedded microfluidic architectures, a total thickness of 15 μm, and a 7 μm gap was tested. A sine wave input with 1.5 Vpp and 800 mV DC bias with 50× amplification was utilized. These input combination gave a total voltage input of ~115 V. The behavior of the membrane as a function of the input parameters was observed by changing one or more of the peak to peak amplitude, DC bias, frequency, and type of signal, in this case, sine and square waves.

A μPEMs device was driven with a 1.5 Vpp and 800 mV DC bias sinusoidal signal, with two different frequencies, 10 and 100 Hz. Deflection measurements of the microsystem showed a greater deflection at 10 Hz (6 μm) and lower deflection at 100 Hz (2.5 μm).

Figure 27:
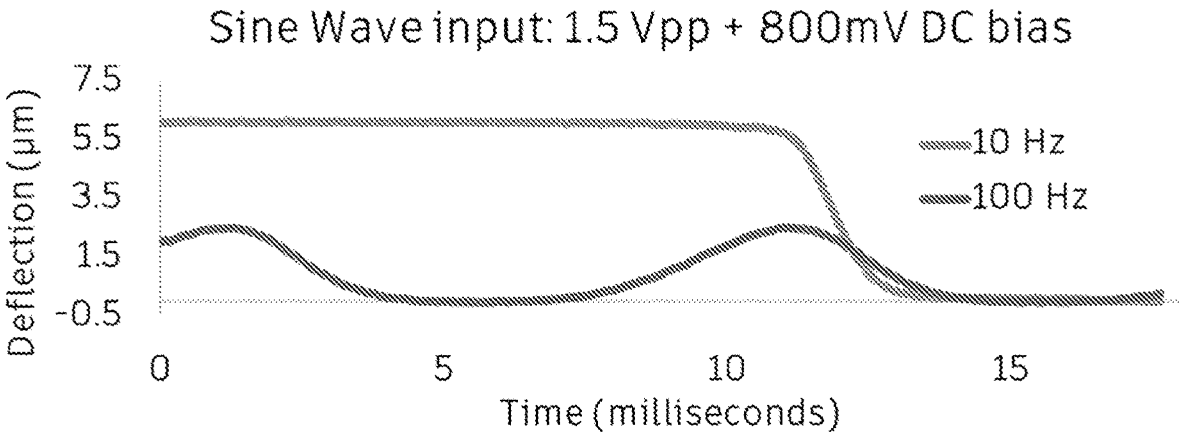
FIG. 27 is a graph comparing the measured deflection of µPEMs with sine wave input (1.5 Vpp+800 mV DC bias with 50× Amplification) at 10 and 100 Hz.

The frequency and system response was influenced by the signal parameters. It allowed for more deflection while the frequency was slower and the actuation response was more accurate. Plot showing the comparison of both signals is show in FIG. 27

Figure 29:
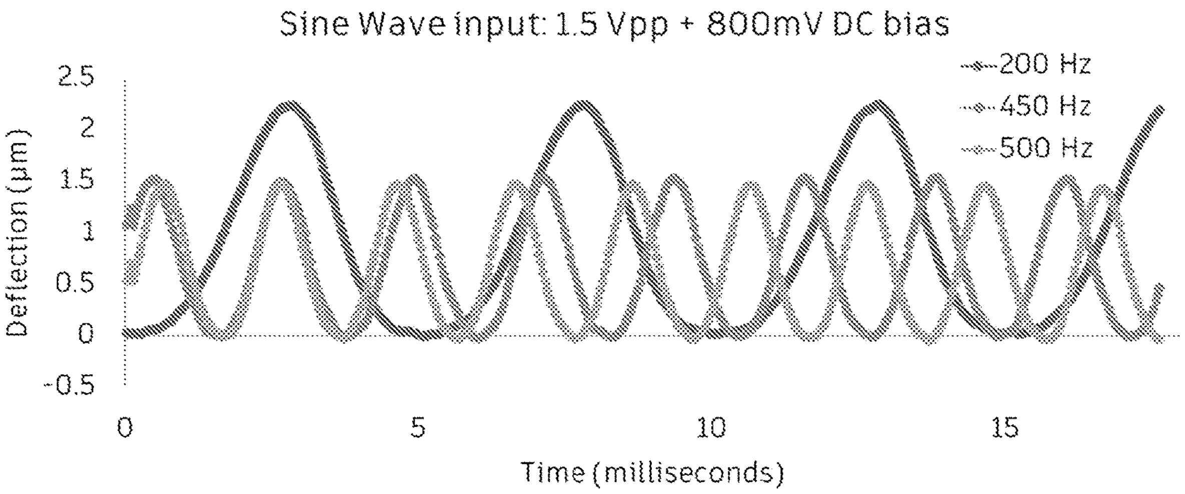
FIG. 29 is a graph comparing the measured deflection of µPEMs with sine wave input (1.5 Vpp+800 mV DC bias with 50× Amplification) at 200, 450 and 500 Hz.

Referring to FIG. 29, the deflection of the membranes was plotted for several different frequencies, such as 10 Hz, 100 Hz, 200 Hz, 450 Hz and 500 Hz and showed a decrease in the deflection as the frequency increased. Without intending to be bound by theory, it is believe that the higher frequencies are fast enough for the μPEMs response capabilities, and deflection decreases are due to the rapid changes and transitions from the input signals. Higher frequency within a sinusoidal signal will result in a less amount of deflection due to the reaction limits of the microsystem.

Figure 28:
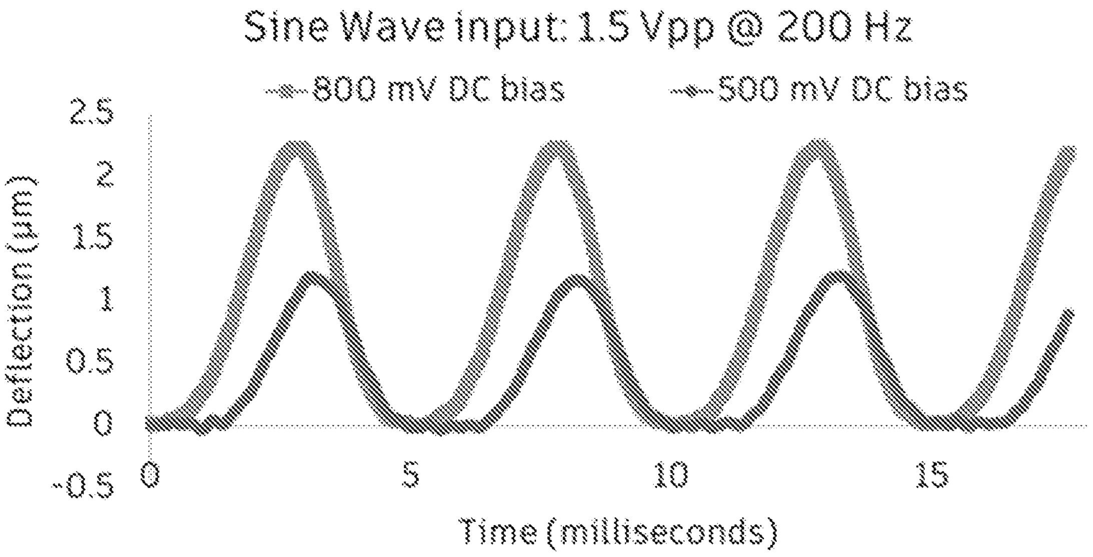
FIG. 28 is a graph comparing the measured deflection of µPEMs with sine wave input (1.5 Vpp with 50× Amplification at 200 Hz) with 800 mV DC bias and 500 mV DC Bias.

Other parameters were modified in order to study the response of the microsystems to different variation of signal inputs. A Sine wave signal was applied to the microsystem with a 1.5 Vpp. a frequency of 200 Hz, with two different voltage bias, 500 mV and 800 mV DC. The results demonstrated a deflection increase of almost twice while increasing the voltage bias within the signal. For 800 mV a maximum deflection of 2.2 μm was measured, while for 500 mV a deflection of 1.1 μm was achieved. Deflection outcomes from the signals is plotted on FIG. 28.

Figure 30:
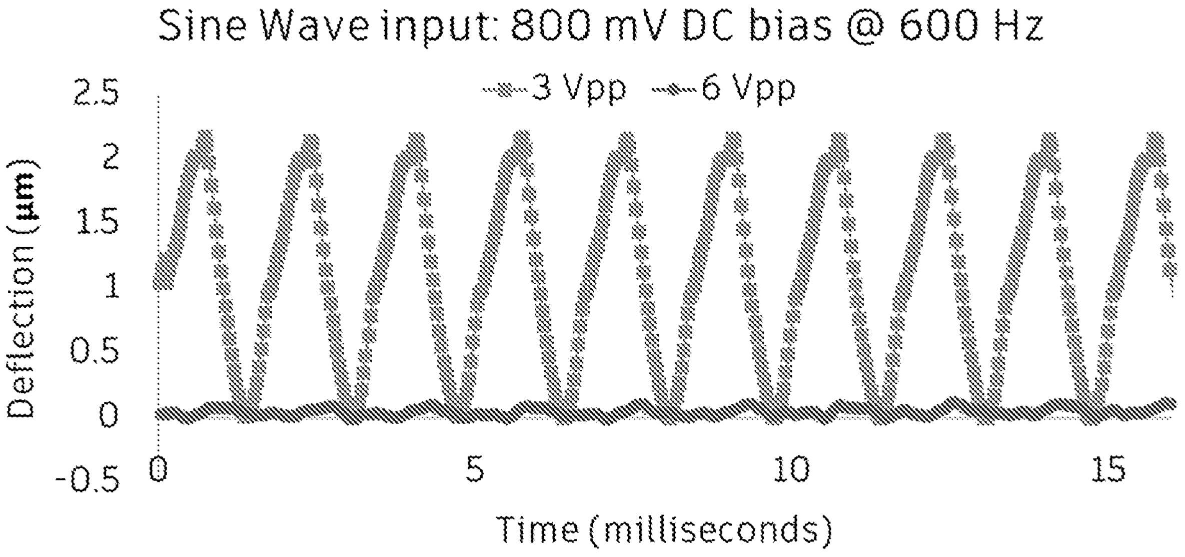
FIG. 30 is a graph comparing the measured deflection of µPEMs with sine wave input (1.5 Vpp+800 mV DC bias with 50× Amplification) at 2 kHz and 5 kHz.

In a similar manner, voltage from the peak to peak amplitude were tuned up and deflection was measured. A 600 Hz sine wave with 800 mV DC bias was applied to the microsystem. The amplitude of the peak to peak voltage was 3 Vpp and 6 Vpp, and deflections per condition were measured. It was observed that while increasing the Vpp, the voltage value reached the maximum threshold that the membrane actuator can withstand before it completely collapses. As seen in FIG. 30, the deflection of the membrane at 6 Vpp was ~0 μm, from the 2.2 μm deflection at 3 Vpp.

Figure 31:
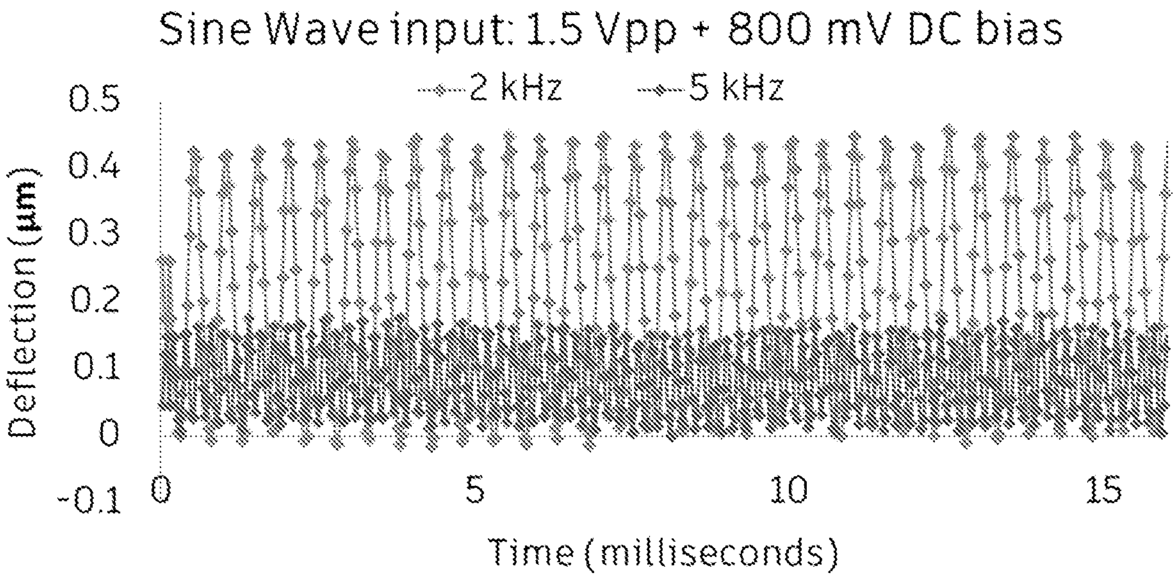
FIG. 31 is a graph comparing the measured deflection of µPEMs with square wave input (4.5 Vpp+2 V DC bias with 50× Amplification) at 50 Hz and 100 Hz.

If the microsystem is subject to different parameter tune ups the behavior and deflection of the same will change significantly. For example, keeping the Vpp and the DC bias constant, but changing the signal frequency will decrease the deflection of the membrane due to the response of the same. As seen in FIG. 31, having two signals, one with 2 kHz and the other one with 5 kHz with the same Vpp and DC bias will decrease in almost 4 times the deflection from the lower actuation frequency.

Figure 32:
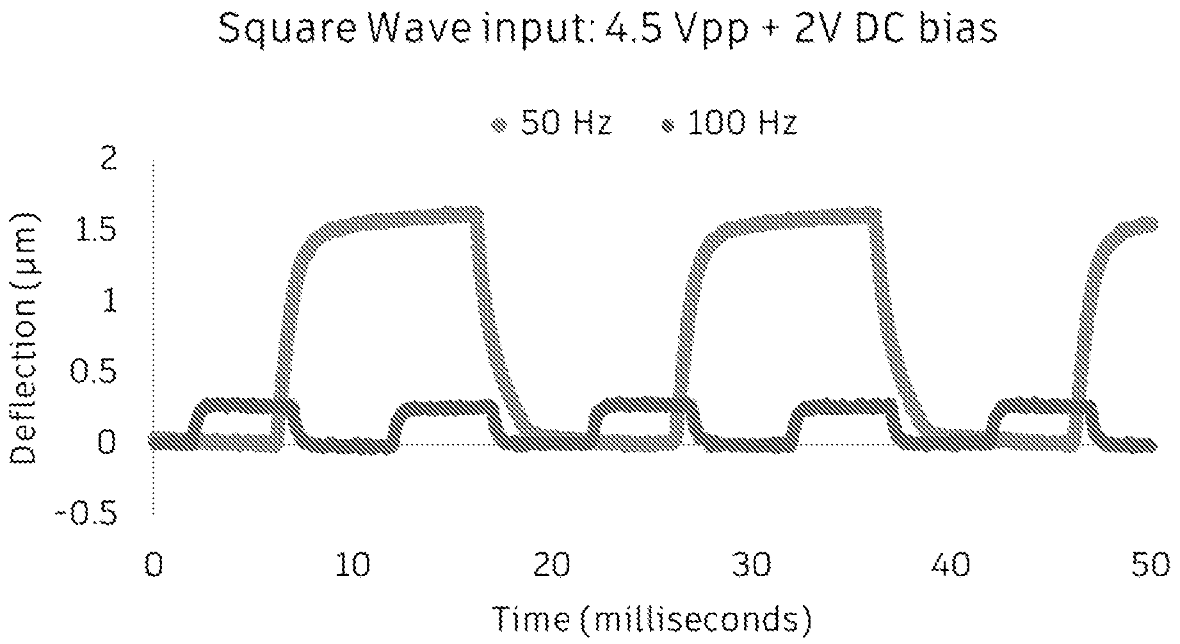
FIG. 32 is a graph comparing the measured deflection of μPEMs with square wave input (4.5 Vpp+2 V DC bias with 50× Amplification) at 50 Hz and 100 Hz.

Square wave signals were also analyzed and tested. The pull-in voltage threshold for these signals differed from the sinusoidal waves. Higher Vpp and DC bias was required in order to actuate the μPEMs. Just like sinusoidal waves, the higher the frequency from the signal the lower the total deflection from the microsystem. For 50 Hz the deflection of the membrane was around 1.5 μm, while doubling the frequency to 100 Hz resulted in the deflection of the membrane decreasing to about 0.3 μm. The behavior of the membrane deflection is shown in FIG. 32.

Different signal inputs were applied to the μPEMs, sinusoidal and square waves with various frequencies, peak to peak amplitudes and DC bias values. While performing these test, the membrane actuators showed particular deflection patterns within the surface. For sinusoidal waves, the deflection pattern was prominent on the edges of the membranes while for square waves inputs, the patterns was noticeable more in the four quadrants of the membrane actuator. These deflection patterns are of particular interest for the applicability of the deflection and actuation of these μPEMs platforms.

Figure 33:
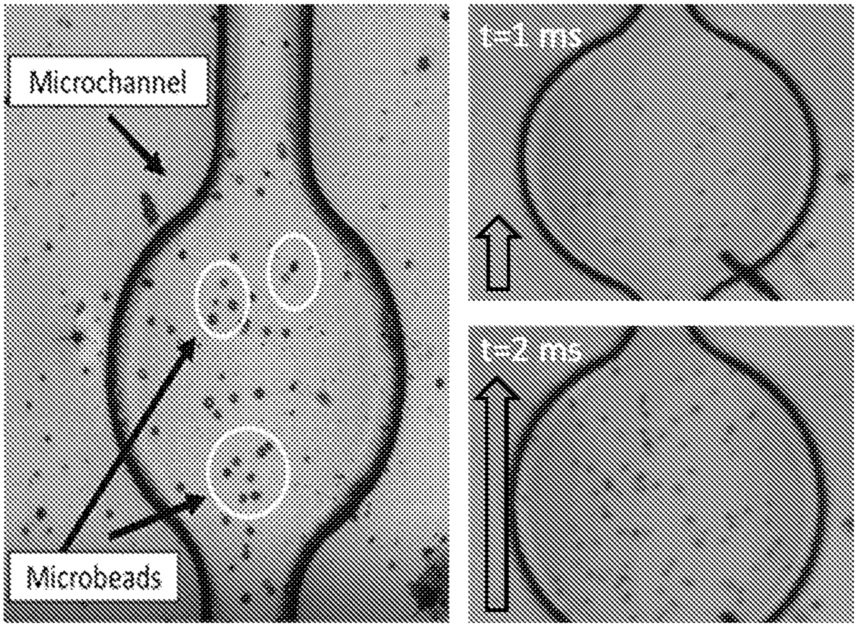
FIG. 33 is an image showing microfluidic channels being perfused with microbeads, with the image on the right showing the flow of the microbeads throughout the micro-channel.

The μPEMs platform with embedded microfluidic architectures were perfused with microbeads (Spherotech Inc., Lake Forest, IL) of 8.91 μm in diameter to validate the appropriate embedding of the architectures on top of the membrane actuators. Microbeads were perfused into the microfluidic reservoirs by pipetting. No leakage was observed. While the particles were in the middle of the microfluidic structure, pictures and videos were taken and recorded with the probe station camera. The previous deflection patterns with the signal inputs allowed for solid-fluid interactions with the perfused microbeads. An image of the microfluidic chamber with microbeads is shown in FIG. 33.

Aspects

1. A device with electrostatic actuation capabilities: a substrate for micromachining and bulk micromachining fabrication approaches; a membrane composite with sandwiched electrodes within the composite; embedded microfluidic channels on top of the membrane composite to create an all-in-one microsystem and monolithic approach for a Lab-on-A-Chip or System-on-A-Chip device for biological/biomedical applications; a bottom electrode(s) patterned inside the cavity recess with an insulation layer avoiding direct contact with the substrate; a top or working electrode(s) sandwiched between the membrane composite, separated by an air gap; and microfluidic channel designs and/or networks that can have one or more inlets, outlets, reservoirs and one or more, microfluidic channel structures and connections within the top of the membrane composite(s) that could have circular, square or beam-like shapes within others.

2. The device of aspect 1 with embedded microfluidic channel(s) and network(s) perfused and filled out with liquid.

3. The device of aspect 1 with embedded microfluidic channel(s) and network(s) filled out with various kind of gas.

4. The device of aspect 1 with embedded microfluidic channel(s) and network(s) where their compartments height and film thicknesses range from 1 to 50 μm.

5. The device of aspect 1 with embedded microfluidic channel(s) and network(s) where it can have one or more sets of bottom/ground electrode(s) and one or more sets of working/positive electrode(s).

6. The device of aspect 1 with embedded microfluidic channel(s) and network(s) where it can have one or more sets of bottom/ground electrode(s) and one or more sets of working/positive electrode(s), formed by depositing conducting materials such as thin film metals such as chrome, gold, aluminum, titanium, platinum, and other conducting thin film materials compatible with polymer micromachining approaches.

7. The device of aspect 1 with embedded microfluidic channel(s) and network(s) where it can have one or more sets of electroactive membranes, a combination of one or more of these systems and mechanisms to create coupled-compartments for micromixing, pumping or fluid flow control within the embedded microfluidic channel(s) and networks.

8. The device of aspect 1 with embedded microfluidic channel(s) and network(s) where it can have one or more sets of electroactive membranes using AC/DC inputs, additionally or alternatively, a combination of one or more of these systems and mechanisms to create coupled compartments for micromixing, pumping or fluid flow control within the embedded microfluidic channel(s) and networks.

9. A method for fabricating a device/systems, the method comprises and is outlined as follows: provide a supporting substrate such as a silicon wafer or silicon dioxide coated wafer with one or both sides polished, or any other supporting substrate; Photolithographic pattern one or more window-shaped opening/designs within the silicon or silicon dioxide coated wafer or any other supporting substrate; Perform etching in the opening or window-shaped designs within the silicon or silicon dioxide coated wafer or any other supporting substrate, silicon etching or any other material from the supporting substrate will be pursued via dry silicon etching approach using a $XeF_2$ etching system or via wet silicon etching approach using KOH etching or any other etching approach for the respective supporting substrate material. Recess or cavity can be of various depths, from nanometers to hundreds of micrometers; Deposit a layer of Parylene C as an insulation layer on both sides of the silicon or silicon dioxide coated wafer or any other supporting substrate, as a protective and insulation layer between the future processing and the silicon substrate or any other supporting substrate; Deposit and pattern a first conducting layer via lift off approach to form a first set of one or more electrodes as the ground or negative electrode(s) of the whole microsystem and devices; Deposit a layer of Parylene C as an insulation layer on both sides of the silicon or silicon dioxide coated wafer, or any other supporting substrate, as a protective and insulation layer; Form a filling and sacrificial layer within the cavity/recess on the silicon or silicon dioxide coated wafer or any other supporting substrate, this filling photoresist or any other material will remain only in one or more cavity/recesses within the silicon substrate or any other supporting substrate, in order to create the air gap between the working electrodes; Deposit a layer of Parylene C to enclose the air gap created for the working electrodes and membrane composite formation; Deposit and pattern a second conducting layer via lift off approach to form a second set of one or more electrodes as the actuation or positive electrode(s) of the whole microsystem and devices on top of the membrane composite, which in fact is the structure that will deflect downwards/upwards after applying a voltage differential using AC/DC input(s) between working electrodes. Deflection can be measured by surface profilometry or optical measurements via OCT approaches; Deposit a layer of Parylene C to insulate the second set of one or more electrodes on top of the membrane composite, in addition to insulate the electrode(s) from the microfluidic channel structures coming up in the next step of the microfabrication; Pattern microfluidic channel structures and networks on top of the membrane composite(s) with one or more sacrificial layers, commonly using photoresist as the sacrificial layer. Microfluidic channel structures could range in height from nanometers to hundreds of micrometers; Deposit a layer of Parylene C to enclose the microfluidic channel structures formed by the sacrificial layer of photoresist or any other material, forming a microshell structure for the microfluidic channel and network(s); Open regions such as microfluidic reservoirs, inlets, outlets, and venting holes to get access to the sacrificial layers of photoresist or any other materials used as sacrificial layers; Diced silicon or silicon dioxide coated wafers or any other supporting substrate, to separate in individual dies each of the devices for further microfabrication steps; Individual dies are soaked in Acetone and/or IPA, or any other solution and machine such as a critical point dryer to release sacrificial layers to free-support the individual devices for further packaging; Perform other steps, as desired such as packaging, bonding into PCBs, electrical connections within the dies and PCBs for ease of handling, testing and characterization within characterization apparatus and systems, within others.

10. The method of aspect 9 where the sacrificial layers are defined using positive photoresist.

11. The method of aspect 9 where the sacrificial layers are defined using thick-positive photoresist.

12. The method of aspect 9 where the sacrificial layers are removed, and devices are released via soaking in baths of Acetone.

13. The method of aspect 9 where the sacrificial layers are removed, and die devices are released via soaking in baths of IPA 14. The method of aspect 9 where the sacrificial layers are removed, and die devices are released via soaking in prolonged baths of IPA.

15. The method of aspect 9 where the sacrificial layers are removed, and die devices are released via soaking in prolonged baths of Acetone and/or IPA.

16. The method of aspect 9 where the sacrificial layers are removed, and die devices are released via soaking in Acetone inside a critical point dryer system.

17. The method of aspect 9 where the sacrificial layers are removed, and die devices are released via soaking in IPA inside a critical point dryer system.

18. The method of aspect 9 where the sacrificial layers are removed, and die devices are released via soaking in Acetone/IPA inside a critical point dryer system.

19. The method of aspect 9 where the sacrificial layers are removed, and die devices are released via soaking in Methanol inside a critical point dryer system.

20. The method of aspect 9 where the sacrificial layers are removed, and die devices are released via soaking in Acetone/IPA/Methanol inside a critical point dryer system.

21. The method of aspect 9 where all the structural layers of thin film polymer are of Parylene C deposited by chemical vapor deposition.

22. The method of aspect 9 where all the silicon or any other substrate material is etch using wet or dry etching approaches, such as HF, KOH, $XeF_2$ dry etching system, HNA, within others depending on the substrate material.

Directional terminology, such as "top", "bottom", "upper", "lower", "above", "below", "beneath", "front", "back", "over", "under", "left", "right", etc. is used with reference to the orientation of the components/features in the figures described before. Because some of the components or structures in various devices can be positioned in a few different ways and orientations, directional terminology is used for purposes of illustration only and is in no way limiting. The directional terminology is intended to be construed broadly, and therefore should not be interpreted to preclude components or structures being oriented in different ways.

Several techniques and process flow steps are described herein in detail with reference to examples as illustrated in the accompanying drawings. In the foregoing description, numerous specific details are set forth in order to provide a better understanding of one or more aspects and/or features described within the flow chart or drawings. It will be apparent, however, to one skilled in the art, that one or more aspects and/or features described may be practiced without some or all of these specific details. In other aspects, well-known process steps and/or structures have not been described in detail to not make the reader to misunderstand or simply to avoid obscuring some of the aspects and/or features described. Further, some fabrication and micromachining processes may be performed simultaneously despite being described or implied as occurring non-simultaneously. Moreover, the illustration/drawing of a process by its description in a drawing does not imply that the illustrated process is exclusive of other variations and modifications, does not imply that the illustrated process or any of its steps does not imply that the illustrated process or any of its steps are necessary to one or more of the examples, and also does not imply that the illustrated process is preferred for the successful fabrication and integration of the device.

What is claimed is:

1. A device, comprising:

a substrate having a cavity defined therein;

one or more bottom electrodes disposed within the cavity;

an electroactive membrane having one or more portions fixed to the substrate and a portion extending over the cavity, the electroactive membrane being formed from a polymer-metal composite, the composite comprising a polymeric membrane material having one or more top electrodes disposed within the polymeric membrane material; and a microfluidic structure arranged on top of the membrane, the microfluidic structure comprising one or more microfluidic channels and/or one or more microfluidic chambers, wherein:

the one or more top electrodes and the bottom electrodes are separated by a gap having a first gap distance defined by a depth of the cavity when there is no applied voltage, and the portion of the electroactive membrane extending over the cavity is adapted to actuate into the cavity upon application of a voltage between the one or more top and bottom electrodes such that at least a portion of the gap is reduced to a second gap distance smaller than the first gap distance.

2. The device of claim 1, wherein the microfluidic structure is integrally formed in the composite material.

3. The device of claim 1, wherein the polymeric membrane material comprises a first layer and a second layer and the top electrode is disposed between the first and second layers.

4. The device of claim 1, wherein the microfluidic structure comprises a microchamber arranged over the membrane.

5. The device of claim 1, wherein the membrane has a thickness of about 5 μm to about 25 μm and/or the membrane has a surface area of about 300 $\mu m^2$ to about 2,250,000 $\mu m^2$.

6. The device of claim 1, wherein the first gap distance is about 5 μm to about 20 μm and/or the gap has a gap width of about 100 μm to about 1,500 μm.

7. The device of claim 1, comprising 1 to 8 top and/or bottom electrodes.

8. The device of claim 1, wherein the membrane is rectangular, circular, elliptical, formed as a plate supported on all sides, a suspended bridge, or formed as a cantilever bridge.

9. A system, comprising:

a substrate having two or more cavities defined therein;

one or more bottom electrodes disposed within each of the two or more cavities;

two or more electroactive membranes each having one or more portions fixed to the substrate and a portion extending over a respective one of the two or more cavities, the two or more electroactive membranes each being formed from a polymer-metal composite, the composite comprising a polymeric membrane material having one or more top electrodes disposed within the polymeric membrane material; and a microfluidic structure arranged on top of the two or more membranes, the microfluidic structure comprising one or more microfluidic channels and/or one or more microfluidic chambers, wherein:

the one or more top electrodes and the one or more bottom electrodes of each membrane and respective cavity over which the membrane extends are separated by a gap having a first gap distance defined by a depth of the cavity when there is no applied voltage, and the portion of each electroactive membrane extending over the respective cavity is adapted to actuate into the cavity upon application of a voltage by the one or more top electrodes and the one or more bottom electrodes such that at least a portion of the gap is reduced to a second gap distance smaller than the first gap distance.

10. The system of claim 9, wherein the microfluidic structure is integrally formed in the composite material of the two or more membranes.

11. The system of claim 9, wherein the polymeric membrane material of each of the two or more electroactive membranes comprises a first layer and a second layer and the top electrode is disposed between the first and second layers.

12. The system of claim 9, wherein the microfluidic structure comprises at least one microchamber arranged over one or more of the two or more electroactive membranes.

13. The system of claim 9, wherein the membrane has a thickness of about 5 μm to about 25 μm and/or a surface area of about 300 $\mu m^2$ to about 2,250,000 $\mu m^2$.

14. The system of claim 9, wherein the first gap distance is about 5 μm to about 20 μm and/or wherein the gap has a gap width of about 100 μm to about 1,500 μm.

15. The system of claim 9, wherein each membrane has a shape independently selected from rectangular, circular, elliptical plate supported on all sides, a suspended bridge, and a cantilever bridge.

16. A method of making the device of claim 1, comprising:

defining the cavity in the substrate;

depositing a first thin film of polymeric membrane material on at least a bottom surface of the cavity;

depositing a metal layer on the first thin film of polymeric membrane material to form the one or more bottom electrodes;

filling the cavity with a photoresist;

depositing a second thin film of polymeric membrane material on the photoresist filled within the cavity;

patterning a metal layer on the second thin film of polymeric membrane material to form the one or more top electrodes;

depositing a third thin film of polymeric membrane material on the one or more top electrodes;

depositing and patterning a photoresist on the third thin film to define the microfluidic structure;

depositing a fourth thin film of polymeric material on the photoresist patterned to define the microfluidic structure;

removing the photoresist patterned to define the microfluidic structure and the photoresist filled within the cavity to thereby form the device.

17. A method of using the device of claim 1, comprising:

introducing a fluid sample into the microfluidic structure; and applying a voltage to the membrane using the one or more top electrodes and the bottom electrodes to actuate the membrane, thereby introducing a force into the fluid sample thereby promoting circulation of the flow of the sample and/or introduce a stress and/or strain into the sample.

18. The method of claim 17, wherein the methods is an in vitro model for studying the sample under induced stress and/or strain.

19. The method of claim 17, comprising introducing two or more fluid samples into the microstructure, wherein actuating the membrane results in mixing of the two or more fluid samples through circulation of the fluids.

20. The method of claim 17, wherein the method is for cell sorting and actuation of the membrane changes and/or modulates a cell's trajectory through the microfluidic structure and/or the fluid circulation or wherein the method is for growth of strain sensitive cells.

* * * * *